United States Patent
Houda

(10) Patent No.: US 9,513,142 B2
(45) Date of Patent: Dec. 6, 2016

(54) DEVICE FOR DETECTING MULTI-TURN ABSOLUTE ROTATION ANGLE AND METHOD FOR DETECTING THE SAME

(75) Inventor: Akihiko Houda, Ibaraki (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 681 days.

(21) Appl. No.: 13/978,375

(22) PCT Filed: Jan. 6, 2012

(86) PCT No.: PCT/JP2012/050160
§ 371 (c)(1),
(2), (4) Date: Jul. 3, 2013

(87) PCT Pub. No.: WO2012/093716
PCT Pub. Date: Jul. 12, 2012

(65) Prior Publication Data
US 2013/0289936 A1 Oct. 31, 2013

(30) Foreign Application Priority Data

Jan. 7, 2011 (JP) ................. 2011-002454
May 11, 2011 (JP) ................. 2011-106368

(51) Int. Cl.
*G01D 5/20* (2006.01)
*G01B 5/24* (2006.01)
(Continued)

(52) U.S. Cl.
CPC ...... *G01D 5/20* (2013.01); *G01B 5/24* (2013.01); *G01B 7/30* (2013.01); *G01D 5/2451* (2013.01)

(58) Field of Classification Search
CPC ........... G01B 5/24; G01B 7/30; G01D 5/2451; G01D 5/20
(Continued)

(56) References Cited

U.S. PATENT DOCUMENTS 4,339,950 A 7/1982 Lendino
4,572,951 A * 2/1986 Toda ............... G01B 7/003
250/231.18
(Continued)

FOREIGN PATENT DOCUMENTS

JP 58-106691 6/1983
JP 59-190612 10/1984
(Continued)

OTHER PUBLICATIONS

ISR & Written Opinion from corresponding Int'l Application No. PCT/JP2012/076093 Dec. 11, 2012.
(Continued)

*Primary Examiner* — Carol S Tsai
(74) *Attorney, Agent, or Firm* — Bryan Cave LLP

(57) ABSTRACT

There is provided a method for calculating with high accuracy a multi-turn absolute rotation angle of a motor rotating shaft coupled to a motor output shaft. In a rotation angle detection device according to this invention, a rotation angle $\theta_n$ of an n-th rotating shaft satisfies the relationship with a rotation angle $\theta_1$ of the motor rotating shaft: $\theta_n = (-(m\pm 1)/m)^{n-1} \times \theta_1$. The rotation angle detection device as an embodiment of a mechanism satisfying the relationship includes a gear mechanism in which a gear having (m±1) teeth meshes with a gear having m teeth between each adjacent two of first to n-th rotating shafts. A multi-turn rotation angle of the first rotating shaft is expanded to a detected value $p_1$ of the first rotating shaft which is a rotation angle of the first rotating shaft and $R_0 \times m^0 + R_1 \times m^1 + \ldots R_{n-2} \times m^{n-2}$ corresponding to the number of revolutions of the first rotating shaft, coefficients $R_0$ to $R_{n-2}$ are obtained on the basis of detected values from angle detectors of the respective shafts, and the multi-turn rotation angle of the first rotating shaft is calculated. Detection errors generated in the angle detectors of the second and subsequent rotating shafts can be effectively
(Continued)

reduced, and a high-accuracy multi-turn rotation angle can be calculated.

23 Claims, 19 Drawing Sheets

(51) Int. Cl.
*G01B 7/30* (2006.01)
*G01D 5/245* (2006.01)

(58) Field of Classification Search
USPC .......... 702/151; 477/107, 102, 3, 20, 15, 54; 73/862.46, 862.326; 708/201; 324/207.25, 324/207.2
See application file for complete search history.

(56) References Cited

U.S. PATENT DOCUMENTS

| | | | |
|---|---|---|---|
| 4,997,414 A | 3/1991 | Camara | |
| 5,403,245 A * | 4/1995 | Watanabe | B60W 10/06 477/102 |
| 5,457,371 A | 10/1995 | Gordon | |
| 5,930,905 A | 8/1999 | Zabler | |
| 5,950,052 A * | 9/1999 | Nomura | G03G 15/0126 399/167 |
| 6,026,925 A * | 2/2000 | Nagao | B62D 5/043 180/444 |
| 6,507,188 B1 | 1/2003 | Dilger | |
| 6,892,588 B2 * | 5/2005 | Nagase | G01L 3/109 73/862.326 |
| 6,941,241 B2 | 9/2005 | Lee | |
| 7,040,025 B2 | 5/2006 | Inoue | |
| 7,307,415 B2 * | 12/2007 | Seger | G01D 5/142 324/207.2 |
| 7,637,020 B2 | 12/2009 | Maier | |
| 7,775,129 B2 * | 8/2010 | Oike | G01D 5/2086 73/862.326 |
| 7,854,680 B2 * | 12/2010 | Sugai | B60K 6/445 477/15 |
| 8,378,666 B2 * | 2/2013 | Putinier | G01D 5/2452 324/207.25 |
| 8,493,572 B2 | 7/2013 | Milvich | |
| 2004/0020309 A1 * | 2/2004 | Nagase | G01L 3/109 73/862.339 |
| 2006/0042074 A1 * | 3/2006 | Stork | F01L 1/34 29/622 |
| 2008/0188346 A1 * | 8/2008 | Sugai | B60K 6/445 477/15 |
| 2009/0257074 A1 * | 10/2009 | Kazama | H04N 1/053 358/1.9 |
| 2010/0114524 A1 | 5/2010 | Saito | |
| 2010/0235054 A1 | 9/2010 | Hoskins | |
| 2013/0147469 A1 | 6/2013 | Noda | |
| 2014/0005976 A1 | 1/2014 | Platzer | |
| 2014/0172932 A1 | 6/2014 | Houda | |
| 2014/0290079 A1 | 10/2014 | Houda | |

FOREIGN PATENT DOCUMENTS

| | | |
|---|---|---|
| JP | 60-239608 | 11/1985 |
| JP | 60-239618 | 11/1985 |
| JP | 61-017913 | 1/1986 |
| JP | 63-242028 | 10/1988 |
| JP | 4-21813 | 2/1992 |
| JP | 04-212017 | 8/1992 |
| JP | 05-038243 | 2/1993 |
| JP | 2002-107178 | 4/2002 |
| JP | 2003-344110 | 12/2003 |
| JP | 2004-138606 | 5/2004 |
| JP | 3665732 | 6/2005 |
| JP | 2008-039737 | 2/2008 |
| JP | 2008-265414 | 11/2008 |
| JP | 2009-229396 | 10/2009 |
| JP | 2010-044055 | 2/2010 |

OTHER PUBLICATIONS

ISR & Written Opinion from Int'l Application No. PCT/JP2012/066490 Sep. 11, 2012.
ISR & Written Opinion from Int'l Application No. PCT/JP2012/050160 Mar. 13, 2012.
Hayashi, Y., et al., "Development of High Resolution and Compact Absolute Rotary Encoder with Batteryless Multi-turn Detecting Function," Journal of the Japan Society of Precision Engineering, 2000, vol. 66, No. 8, pp. 1177-1180.

* cited by examiner

DEVICE FOR DETECTING MULTI-TURN ABSOLUTE ROTATION ANGLE AND METHOD FOR DETECTING THE SAME

CROSS-REFERENCE TO RELATED APPLICATIONS

This application is a national stage application under 35 U.S.C. 371 of and claims priority to International Patent Application No. PCT/JP2012/050160, filed Jan. 6, 2012, which claims priority to Japanese Patent Application Nos. 2011-002454 and 2011-106368 filed on Jan. 7, 2011 and May 11, 2011, respectively. International Patent Application No. PCT/JP2012/050160 and Japanese Patent Application Nos. 2011-002454 and 2011-106368 are incorporated herein by reference.

FIELD OF THE INVENTION

The present invention relates to a device for detecting a rotation angle of a rotating shaft and, more particularly, to a rotation angle detection device which can detect an absolute rotation angle of a rotating shaft over multiple turns without battery-based backup or the like.

DESCRIPTION OF THE BACKGROUND

A rotation angle detection device, for example, detects a rotation angle of a rotating shaft of a motor and controls the position of a movable body of a machine tool or the like which is driven by the motor according to a detected value of the rotation angle. In order to control the position of the movable body with high accuracy over a wide range, the rotation angle detection device is desirably capable of detecting the motor rotating shaft as an absolute rotation angle over multiple turns.

As such a rotation angle detection device, Japanese Patent Laid-Open No. 2010-44055 (corresponding to U.S. patent application Ser. No. 12/168,151) discloses an inductive multi-turn encoder. The inductive multi-turn encoder 10 includes geared circular disks 41 to 46 connected in series and in multiple stages and realizes detection of a multi-turn angle by detection of rotation angles of the disks 42, 44, and 46. A range of a multi-turn angle which can be detected by the inductive multi-turn encoder disclosed in the prior art literature is determined by a reduction ratio of the disk 46 in the final stage to an input rotatable shaft. A rotatable shaft 20 as the input rotatable shaft is mechanically connected to the circular disk 4I with a gear reduction ratio of I:4. The subsequent geared circular disks 4I" and 42, 42" and 43, 43" and 44, 44" and 45, and 45" and 46 are mechanically connected with respective gear reduction ratios of 1:4. By making such 1:4 gear reductions in six stages, the multi-turn encoder 10 can obtain a multi-turn detection range up to 4096 revolutions.

Patent References

Patent Reference 1: Japanese Patent Laid-Open No. 2010-44055
Patent Reference 2: Japanese Patent Laid-Open No. 2002-107178
Patent Reference 3: Japanese Patent No. 3967963
Patent Reference 4: Japanese Patent Publication No. 05-38243

Non-Patent Reference

Non Patent Literature 1: Yasukazu Hayashi and four others, "Development of High Resolution and Compact Absolute Rotary Encoder with Batteryless Multi-turn Detecting Function," Journal of the Japan Society of Precision Engineering, 2000, Vol. 66, No. 8, pp. 1177-1180

The above-described inductive multi-turn encoder obtains a multi-turn rotation angle directly from a rotation angle of a circular disk at reduced speed. In order to set a multi-turn detection range to be wide, a reduction ratio needs to be increased. As a result, such an inductive multi-turn encoder suffers from the problems of increase in mechanistic complexity and size and rise in cost.

In order to remedy the problems, the encoder introduced in "Development of High Resolution and Compact Absolute Rotary Encoder with Batteryless Multi-turn Detecting Function" (Journal of the Japan Society of Precision Engineering, 2000, Vol. 66, No. 8, pp. 1177-1180) and the resolver disclosed in Japanese Patent Laid-Open No. 2002-107178 each include respective angle detectors for detecting rotation angles of rotating shafts connected in parallel to a rotating input shaft with different change ratios and detect a multi-turn absolute position on the basis of pieces of rotation angle information obtained from the angle detectors.

In a method which obtains multi-turn information from the relationship among rotation angles of a plurality of shafts connected in parallel with different change ratios, however, a detection range of a multi-turn angle is generally determined by the least common multiple of periodic signals obtained by processing angle detected signals of the shafts. A method for detecting a multi-turn absolute rotation angle as described in the prior art literatures needs to select a change ratio equal to the ratio between numbers relatively prime to each other to set a multi-turn angle detection range to be wide, which results in the problem of increase in the number of gear types. Also, the flexibility in designing a multi-turn angle detection range is restricted due to the limited number of numbers relatively prime to one another. Additionally, various multi-turn angle detection ranges fit other applications, and it is inconvenient that the upper end of a practicable multi-turn angle detection range is limited to a special value, such as the least common multiple of values relatively prime to one another. Moreover, since the above-described method suffers from the problem of the complexity of computation at the time of obtaining a multi-turn absolute position from pieces of rotation angle information of the shafts.

In order to cope with the problem of the complexity of the computation for obtaining a multi-turn absolute position, Japanese Patent Laid-Open No. 2002-107178 discloses an absolute position detection method which stores a table (FIG. 9) showing the relationship between values obtained from rotation angles of respective rotating shafts and the number of revolutions of a main rotating shaft in advance in a memory and selects, from the table, the number of revolutions of the main rotating shaft corresponding to values obtained from rotation angles of the rotating shafts. However, in order to set a multi-turn detection range to be wide, large memory corresponding to the multi-turn detection range (0 to 20357) is consumed, which is problematic.

Japanese Patent No. 3967963 discloses a computation method which saves memory by storing computation results for only one of two periods in a memory. However, this method has the same problem with memory usage as the problem of the above-described detection method.

As for a computation method for obtaining a multi-turn absolute rotation angle, Japanese Patent Publication No. 05-38243 creates a relational expression of detected values from a plurality of angle detectors with respect to a shaft rotation angle and searches for a multi-turn absolute rotation angle by using a program which determines a shaft rotation angle simultaneously satisfying detected values of the shafts by sequential substitution. If a multi-turn detection range is wide, the number of combinations among which search is made increases, which causes the problem of time-consuming calculation.

DESCRIPTION

Figure 1:
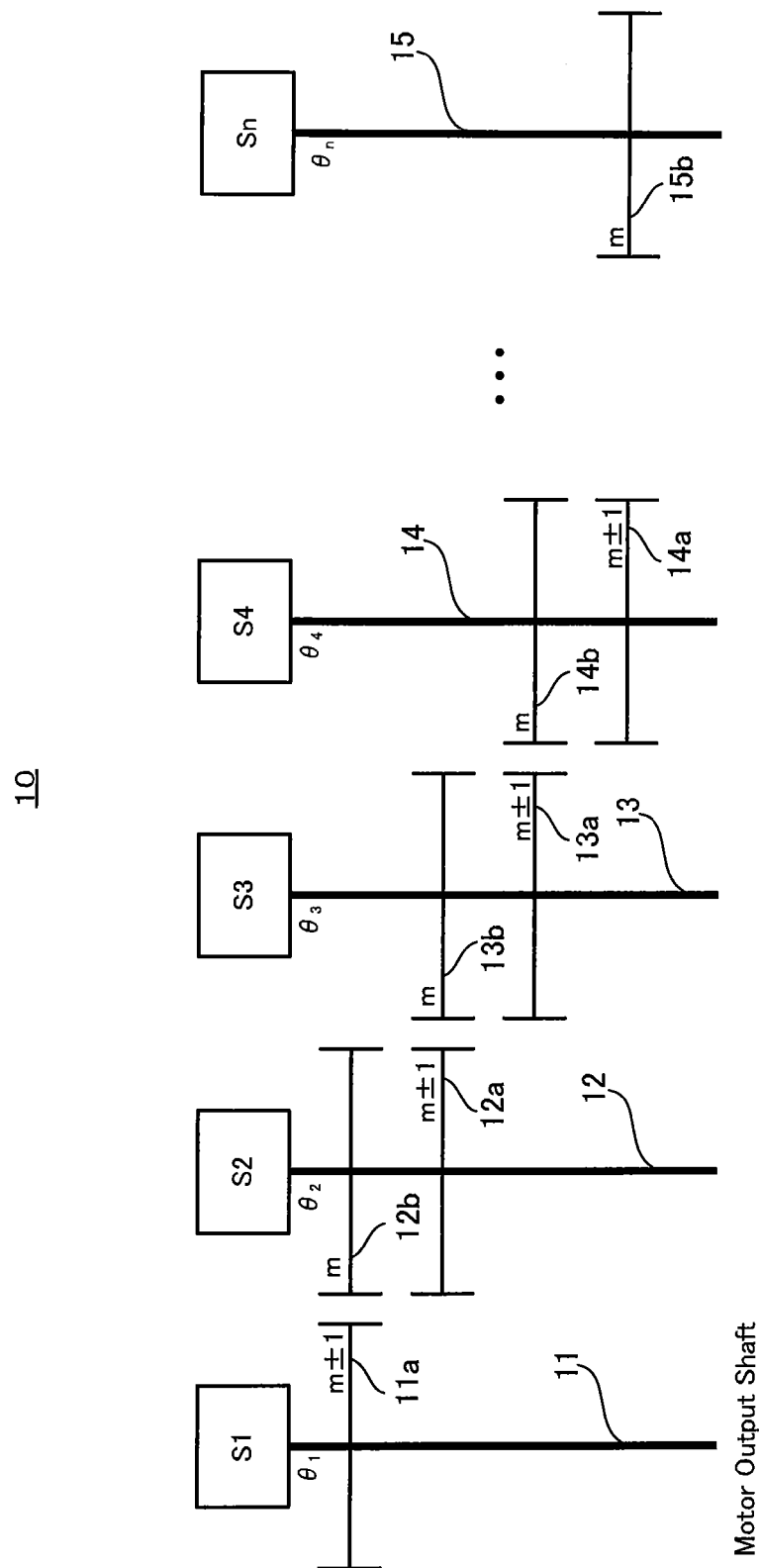
FIG. 1 is a configuration block diagram of a transmission mechanism of a rotation angle detection device for explaining the principle of obtaining a multi-turn absolute rotation angle according to a first embodiment of the present invention.

Some embodiments include a multi-turn absolute rotation angle detection device including a transmission mechanism adapted to transmit revolution from a first rotating shaft of first to nmax-th rotating shafts down to the nmax-th rotating shaft, in which a rotation angle $\theta_n$ of the n-th rotating shaft satisfies the relationship with a rotation angle $\theta_1$ of the first rotating shaft:

$$\theta_n = \left(-\frac{m \pm 1}{m}\right)^{n-1} \times \theta_1 \qquad \text{[Expression 1]}$$

and an angle detector adapted to detect respective rotation angles of the first rotating shaft to the n-th rotating shaft. In the above, nmax and m are integers not less than 3, and n falls within the range 1≤n≤nmax.

Further embodiments include letting $p_1, p_2, \ldots, P_{nmax}$ be angle detected values of the first rotating shaft to the n-th rotating shaft which are detected by the angle detector and u be an angle detected quantity for one cycle of the rotating shafts, a rotation angle calculated value $\theta_c$ of the first rotating shaft is calculated by $\theta_c = \mathrm{mod}((k_1 \times p_1 + k_2 \times p_2 + \ldots k_n \times p_{nmax}), u) \times m^{nmax-1}$. In the above, mod(x,a) is a modulo operation which obtains a remainder left over when x is divided by a and that coefficients $k_1, \ldots, k_{nmax}$ are each zero, a positive integer, or a negative integer.

In these or other embodiments, the coefficients $k_1, \ldots, k_{nmax}$ correspond to a coefficient of a (n−1)-th degree term in x when the expression $(x+1)^{nmax}$ is expanded.

In some embodiments, the transmission mechanism that transmits revolution from the first rotating shaft down to the n-th rotating shaft is formed to have with a change ratio of (m±1)/m between each adjacent two of the rotating shafts.

In some embodiments, a transmission mechanism is a gear mechanism formed such that gears fixed to rotating shafts from a first rotating shaft to an n-th rotating shaft continuously mesh with each other, the gear mechanism including a plurality of pairs of gears, each pair of gears being meshed together such that a ratio of change in rotational speed is (m±1)/m between two continuous ones of the rotating shafts.

In some embodiments, an angle detected value $p_n$ within one revolution of an n-th rotating shaft is detected by an angle detector attached to respective rotating shafts, a coefficient $R_{n-2}$ is determined on the basis of the detected angle detected value $p_n$, and a rotation angle calculated value $\theta_1(m^{n-1})'$ is obtained by substituting the determined coefficient $R_{n-2}$ into a rotation angle calculation formula below. The rotation angle calculated value $\theta_1(m^{n-1})'$ represents a multi-turn rotation angle of a first rotating shaft, and a rotation angle detection range is 0 to $m^{n-1}$ revolutions.

$$\theta'_{1(m^{n-1})} = p_1 + \sum_{i=2}^{n}(R_{i-2} \times m^{i-2}) \times u \quad \text{[Expression 2]}$$

Values of a coefficient $R_0$ to a coefficient $R_{nmax-2}$ are sequentially determined by repeating, for a numerical value n=2 to nmax, computation of the above rotation angle calculation formula, and a multi-turn absolute rotation angle calculated value $\theta c = \theta_1(m^{nmax-1})'$ is obtained. In the above, the coefficients $R_0$ to $R_{nmax-2}$ are integers ranging from 0 to m−1 inclusive, u is a base unit quantity, and a rotation angle calculated value $\theta_1(m^0)'$ is an angle detected value $p_1$ of the first rotating shaft.

In some embodiments, the coefficient $R_{n-2}$ is determined such that, if the number of rotating shafts is n, a result of calculating the rotation angle calculation formula that obtains the rotation angle calculated value $\theta_1(m^{n-1})'$ of the first rotating shaft approximates a rotation angle calculated value $\theta_1(m^{n-1})$ below of the first rotating shaft. The rotation angle calculated value $\theta_1(m^{n-1})$ is obtained by multiplying, by $m^{n-1}$, a periodic signal $S(m^{n-1})$ which is obtained from angle detected values $p_1$ to $p_n$ of the first to n-th rotating shafts by a formula below. A rotation angle detection range of the rotation angle calculated value $\theta_1(m^{n-1})$ is 0 to $m^{n-1}$ revolutions.

$$S_{m^{n-1}} = \text{mod}((k_1 \times p_1 + k_2 \times p_2' + k_3 \times p_3' + \ldots + k_n \times p_n) \times J^{n-1}, u) \quad \text{[Expression 3]}$$

In the above, $k_1, k_2, \ldots k_n$ are coefficients of a (n−1)-th degree term in x in the expansion $k_1 \times x^0 + k_2 \times x^1 + k_3 \times x^2 \ldots k_n \times x^{n-1}$ of $(x+1)^{n-1}$, $\text{mod}(x,a)$ is a modulo operation which obtains a remainder left over when x is divided by a, and J is a sign-adjusting term which is 1 if a change ratio between each adjacent two of the rotating shafts is −(m−1)/m and is −1 when the change ratio is −(m+1)/m. An angle corrected value $p_n'$ can be calculated by substituting the calculated rotation angle calculated value $\theta_1(m^{n-1})'$ into a following angle corrected value calculation formula:

$$p_n' = \text{mod}\left(\left(-\frac{m \pm 1}{m}\right)^{n-1} \times \theta'_{1(m^{n-1})}, u\right) \quad \text{[Expression 4]}$$

In some embodiments, the coefficient $R_{n-2}$ is obtained by determining an integer which most closely approximates a result of calculating:

$$\frac{\theta_{1(m^{n-1})} - \theta'_{1(m^{n-2})}}{m^{n-2} \times u} \quad \text{[Expression 5]}$$

In some embodiments, the coefficient $R_{n-2}$ can be obtained by computing:

$$R_{n-2} = INT\left(\text{mod}\left(\frac{S_{(m^{n-1})} \times m}{u} - \frac{\theta'_{1(m^{n-2})}}{m^{n-2} \times u} + 0.5, m\right)\right) \quad \text{[Expression 6]}$$

INT(x) is an operation which drops a fractional part of a numerical value x.

In some embodiments, the above coefficient $R_{n-2}$ is determined such that an angle corrected value $p_n'$ given by a formula below most closely approximates an angle detected value $p_n$ of an n-th rotating shaft, and a rotation angle calculated value $\theta_1(m^{n-1})'$ is obtained.

$$p_n' = \text{mod}\left(\left(-\frac{m \pm 1}{m}\right)^{n-1} \times \left(p_1 + \sum_{i=2}^{n}(R_{i-2} \times m^{i-2}) \times u\right), u\right) \quad \text{[Expression 7]}$$

Values of a coefficient $R_0$ to a coefficient $R_{nmax-2}$ are sequentially determined by repeating, for a numerical value n=2 to nmax, computation of the above angle corrected value calculation formula.

In some embodiments, the determined coefficients $R_0$ to $R_{nmax-2}$ are substituted into a following rotation angle calculation formula:

$$\theta'_{1(m^{nmax-1})} = p_1 + \sum_{i=2}^{nmax}(R_{i-2} \times m^{i-2}) \times u \quad \text{[Expression 8]}$$

to obtain a multi-turn absolute rotation angle calculated value $\theta_1(m^{nmax-1})'$ of a first rotating shaft. In the above, the coefficients $R_0$ to $R_{nmax-2}$ are integers ranging from 0 to m−1 inclusive, u is a base unit quantity, and an angle corrected value $p_1'$ is an angle detected value $p_1$ of the first rotating shaft.

In some embodiments, the above coefficient $R_{n-2}$ can be obtained by determining an integer which most closely approximates a result of calculating:

$$\text{mod}\left(\mp\left(p_n - \left(-\frac{m \pm 1}{m}\right)^{n-1} \times \theta'_{1(m^{n-2})}\right) \times \frac{m}{u}, m\right) \quad \text{[Expression 9]}$$

In some embodiments, the coefficient $R_{n-2}$ can be obtained by computing:

$$R_{n-2} = INT\left(\text{mod}\left(\pm\left(p_n - \left(-\frac{m \pm 1}{m}\right)^{n-1} \times \theta'_{1(m^{n-2})}\right) \times \frac{m}{u} + 0.5, m\right)\right) \quad \text{[Expression 10]}$$

INT(x) is an operation which drops a fractional part of a numerical value x.

In some embodiments, the above-described transmission mechanism is provided for each of a plurality of systems, periodic signals and angle corrected values are obtained from the systems, and a multi-turn absolute rotation angle is computed. In particular, m is set such that periods of the periodic signals are relatively prime to each other.

In some embodiments, a transmission mechanism is formed with a single change ratio between each adjacent two of rotating shafts (e.g., two types of gears, ones having m teeth and ones having m±1 teeth, are formed). Component sharing is thus easy. If components are to be integrally formed, a transmission mechanism can be designed using one type of component.

In some embodiments, the upper end of a multi-turn detection range is not limited to the least common multiple of a plurality of values, and the detection range can be arbitrarily designed. For example, the present invention can easily achieve a multi-turn detection range up to $m^{n-1}/N$. Accordingly, a multi-turn detection range up to $2^n$ or $10^n$ or a multi-turn detection range suited to a different application can be easily designed.

Since a multi-turn absolute position can be obtained only by a product-sum operation of detected values, calculation processing can be easily performed at high speed. The present invention is also advantageous in that the present invention need not store detected values of rotating shafts and computation results in a table and saves memory.

In some embodiments, even if errors are included in detected values from angle detectors, the detection errors generated in the angle detectors can be reduced, and a high-accuracy multi-turn rotation angle calculated value can be calculated. In particular, in the calculation, detection errors generated in angle detectors attached to second and subsequent rotating shafts can be eliminated, and a total error can be kept within a detection error generated in a first rotating shaft. As a result, even if a multi-turn rotation angle detection range is expanded by increasing the number of rotating shafts, an error in a calculated multi-turn rotation angle calculated value can be kept within a detection error in the first rotating shaft.

Accuracy required for an angle detector according to the present invention only needs to be enough to determine a coefficient $R^{n-2}$. Since the accuracy may be lower than a case where a multi-turn angle is obtained by directly calculating detected values of shafts, the cost of a multi-turn angle detection device can be reduced.

Since a multi-turn angle detection device which uses the present invention does not require speed change with a ratio of relatively prime numbers, the number of types of gears used is small. Additionally, a multi-turn rotation angle detection range can be freely designed. Moreover, memory reference is unnecessary for multi-turn period calculation, which prevents consumption of much memory that causes rise in the cost of memory components and increase in size.

Embodiments of the present invention will be described below with reference to the drawings. The drawings and descriptions corresponding to the drawings are mere illustrations for embodying the present invention, and it is not intended that the claimed inventions are limited to the embodiments. The present invention is interpreted only on the basis of the terms as defined in the claims, and the terms are interpreted according to their common interpretations.

The principle of obtaining a multi-turn absolute rotation angle according to a first embodiment of the present invention will be described with reference to FIG. 1. In a configuration block diagram shown in FIG. 1 of a transmission mechanism 10 of a rotation angle detection device, a first rotating shaft 11 which is coupled to a motor output shaft is connected to an angle detector S1, which detects an angle detected value $p_1$ indicating an angle within one revolution that corresponds to a rotation angle $\theta_1$ covering a multi-turn angle of the first rotating shaft 11. Similarly, angle detectors S2 to Sn detect respective angle detected values $P_2$ to $p_1$, indicating angles within one revolution that correspond to rotation angles $\theta_2$ to $\theta_n$ covering a multi-turn angle of second to n-th rotating shafts 12 to 15. Gears having m−1 (or m+1) teeth and gears having m teeth are fixed to the first to n-th rotating shafts 11 to 15, and a gear 11a of the first rotating shaft 11 is meshed with a gear 12b of the second rotating shaft 12. A gear 12a which is fixed to the second rotating shaft 12 is meshed with a gear 13b of the third rotating shaft 13. In this manner, the transmission mechanism 10 forms a gear mechanism in which a gear having m−1 (or m+1) teeth meshes with a gear having m teeth between adjacent rotating shafts.

Various embodiments are described using a gear mechanism as a transmission mechanism. A transmission mechanism according to the present invention, however, is not limited to gears, and examples of the transmission mechanism include all elements that can transmit rotational force of a rotating shaft. In the gear mechanism arranged in the above-described manner, a multi-turn absolute rotation angle of the first rotating shaft 11 is calculated by computing the calculation formulae below using the angle detected values $p_1$ to $p_n$ of the first to n-th rotating shafts 11 to 15 detected by the angle detectors S1 to Sn.

Assume a case where gears having m−1 teeth are meshed with corresponding gears having m teeth at the first to n-th rotating shafts 11 to 15 in FIG. 1. In this case, a change gear ratio is represented by (m−1)/m. In the gear mechanism with the first to n-th rotating shafts 11 to 15 arranged in series in this order, each pair of gears meshed together has the identical change gear ratio of (m−1)/m. Accordingly, letting $\theta_1$ be the rotation angle of the first rotating shaft 11, the rotation angle $\theta_n$ of the n-th rotating shaft 15 is represented by Formula (1).

[Expression 11]

$$\theta_n = \left(-\frac{m-1}{m}\right)^{n-1} \times \theta_1 \qquad (1)$$
$$= \left(-1 + \frac{1}{m}\right)^{n-1} \times \theta_1$$

Note that, as for a minus sign before the part (m−1)/m in Formula (1), a rotation direction of the first rotating shaft 11 is expressed as a plus (positive) while a rotation direction reverse to the direction of revolution of the first rotating shaft 11 is expressed as a minus (negative).

Assuming that the transmission mechanism shown in FIG. 1 is a gear mechanism which is formed from the first rotating shaft to the fourth rotating shaft and letting $\theta_1$ be the rotation angle of the first rotating shaft coupled to the motor output shaft, the rotation angle $\theta_2$ of the second rotating shaft, the rotation angle $\theta_3$ of the third rotating shaft, and the rotation angle $\theta_4$ of the fourth rotating shaft are obtained from Formula (1) in the respective manners below.

[Expression 12]

$$\theta_1 = \left(-1 + \frac{1}{m}\right)^0 \times \theta_1 = 1 \times \theta_1 \qquad (2)$$

[Expression 13]

$$\theta_2 = \left(-1 + \frac{1}{m}\right)^1 \times \theta_1 = \left(-1 + \frac{1}{m}\right) \times \theta_1 \qquad (3)$$

[Expression 14]

$$\theta_3 = \left(-1 + \frac{1}{m}\right)^2 \times \theta_1 = \left(1 - \frac{2}{m} + \frac{1}{m^2}\right) \times \theta_1 \qquad (4)$$

[Expression 15]

$$\theta_4 = \left(-1 + \frac{1}{m}\right)^3 \times \theta_1 = \left(-1 + \frac{3}{m} - \frac{3}{m^2} + \frac{1}{m^3}\right) \times \theta_1 \qquad (5)$$

The angle detectors S1 to Sn are detectors which detect the rotation angles (e.g., detected values representing 0(°) to 360(°) of the first to n-th rotating shafts 11 to 15. If the n-th rotating shaft revolves by $\theta_n$, the angle detected value $p_n$ of the angle detector Sn can be expressed by Formula (6).

[Expression 16]

$$p_n = \mathrm{mod}(\theta_n, u) \quad (6)$$

The formula y=mod(x,a) is generally defined as a modulo operation which calculates a remainder y left over when x is divided by a. That is, if the rotation angle of a given one of the rotating shafts is measured in degrees (°), u that is a numerical value (base unit quantity) representing a rotation angle for one cycle is 360(°), the detected value $p_n$ exhibits a value of 0 to 360(°) according to the rotation angle. For example, if the rotation angle $\theta_n$ is 90(°) or 510(°), the detected value $p_n$ is 90(°) or 150(°). Note that if a rotation angle $\theta$ is −1 (°), a detected value p is not treated as −1 (°) but as 359(°). Any unit can be adopted as long as the rotation angle $\theta_n$ and u are expressed in the unit. For example, if the unit quantity is 1 (revolution), the detected value $p_n$ exhibits a value of 0 to 1 according to the rotation angle.

The detected values from the angle detectors will be further described. The angle detectors S1 to Sn that detect the rotation angles of the first to n-th rotating shafts 11 to 15 each output a detected value for one cycle when the corresponding rotating shaft revolves once. For example, letting u be a unit quantity for one cycle, the angle detectors S1 to Sn each output a detected signal of sawtooth form whose detected value monotonically increases from 0 to u according to the rotation angle of the rotating shaft and returns to 0 when the rotating shaft revolves once. The unit of the unit quantity u is a numerical value representing a rotation angle per one cycle. As described above, any unit may be used as long as the unit is the same as the unit of a rotation angle.

If the rotation angles $\theta_1$ to $\theta_4$ represented by Formulae (2) to (5) are substituted into Formula (6), the angle detected values $p_1$ to $p_4$ from the angle detectors S1 to S4 are calculated from the rotation angle $\theta_1$ of the first rotating shaft by Formulae (7) to (10).

[Expression 17]

$$p_1 = \mathrm{mod}(\theta_1, u) \quad (7)$$

[Expression 18]

$$p_2 = \mathrm{mod}\left(\left(-1 + \frac{1}{m}\right) \times \theta_1, u\right) \quad (8)$$

[Expression 19]

$$p_3 = \mathrm{mod}\left(\left(1 - \frac{2}{m} + \frac{1}{m^2}\right) \times \theta_1, u\right) \quad (9)$$

[Expression 20]

$$p_4 = \mathrm{mod}\left(\left(-1 + \frac{3}{m} - \frac{3}{m^2} + \frac{1}{m^3}\right) \times \theta_1, u\right) \quad (10)$$

Assuming a periodic signal whose one cycle corresponds to m revolutions of the first rotating shaft, a modulo formula representing the periodic signal, $S(m^1)$, can be expressed as:

[Expression 21]

$$S_{(m^1)} = \mathrm{mod}\left(\frac{1}{m} \times \theta_1, u\right)$$

From the relationship mod(a+b,u)=mod(mod(a,u)+mod(b,u),u), the modulo formula representing the periodic signal $S(m^1)$ can be deformed in the manner as in Formula (11) by using the angle detected value $p_1$ of the first rotating shaft and the angle detected value $p_2$ of the second rotating shaft.

[Expression 22]

$$\begin{aligned}S_{(m^1)} &= \mathrm{mod}\left(\frac{1}{m} \times \theta_1, u\right) \\ &= \mathrm{mod}\left(\mathrm{mod}(\theta_1, u) + \mathrm{mod}\left(\left(-1 + \frac{1}{m}\right)\times\theta_1, u\right), u\right) \\ &= \mathrm{mod}(p_1 + p_2, u)\end{aligned} \quad (11)$$

Assuming a periodic signal whose one cycle corresponds to $m^2$ revolutions of the first rotating shaft, a modulo formula representing the periodic signal, $S(m^2)$, can be expressed as:

[Expression 23]

$$S_{(m^2)} = \mathrm{mod}\left(\frac{1}{m^2} \times \theta_1, u\right)$$

The modulo formula representing the periodic signal $S(m^2)$ can be deformed in the manner as in Formula (12) by using the angle detected values $p_1$, $p_2$, and $p_3$ of the first to third rotating shafts.

[Expression 24]

$$\begin{aligned}S_{(m^2)} &= \mathrm{mod}\left(\frac{1}{m^2} \times \theta_1, u\right) \\ &= \mathrm{mod}\Big(\mathrm{mod}(\theta_1, u) + 2 \times \mathrm{mod}\left(\left(-1 + \frac{1}{m}\right)\times\theta_1, u\right) + \\ &\quad \mathrm{mod}\left(\left(1 - \frac{2}{m} + \frac{1}{m^2}\right)\times\theta_1, u\right), u\Big) \\ &= \mathrm{mod}(p_1 + 2p_2 + p_3, u)\end{aligned} \quad (12)$$

Assuming a periodic signal whose one cycle corresponds to $m^3$ revolutions of the first rotating shaft, a modulo formula representing the periodic signal, $S(m^3)$, can be expressed as:

[Expression 25]

$$S_{(m^3)} = \mathrm{mod}\left(\frac{1}{m^3} \times \theta_1, u\right)$$

The modulo formula representing the periodic signal $S(m^3)$ can be deformed in the manner as in Formula (13) by using the angle detected values $p_1$, $p_2$, $p_3$, and $p_4$ of the first to fourth rotating shafts.

[Expression 26]

$$\begin{aligned}S_{(m^3)} &= \mathrm{mod}\left(\frac{1}{m^3} \times \theta_1, u\right) \\ &= \mathrm{mod}\Big(\mathrm{mod}(\theta_1, u) + 3 \times \mathrm{mod}\left(\left(-1 + \frac{1}{m}\right)\times\theta_1, u\right) + \\ &\quad 3 \times \mathrm{mod}\left(\left(1 - \frac{2}{m} + \frac{1}{m^2}\right)\times\theta_1, u\right) + \\ &\quad \mathrm{mod}\left(\left(-1 + \frac{3}{m} - \frac{3}{m^2} + \frac{1}{m^3}\right)\times\theta_1, u\right), u\Big) \\ &= \mathrm{mod}(p_1 + 3p_2 + 3p_3 + p_4, u)\end{aligned} \quad (13)$$

Assuming a periodic signal whose one cycle corresponds to $m^{n-1}$ revolutions of the first rotating shaft, a modulo formula representing the periodic signal can be generally expressed as:

$$\mathrm{mod}\left(\frac{1}{m^{n-1}} \times \theta_1, u\right) \qquad \text{[Expression 27]}$$

By deduction from Formulae (11) to (13), the periodic signal, $S(m^{n-1})$, can be represented as a periodic signal calculation formula in Formula (14). In Formula (14), n is the number of rotating shafts.

[Expression 28]

$$S_{(m^{n-1})} = \mathrm{mod}\left(\left(\frac{1}{m}\right)^{n-1} \times \theta_1, u\right) \qquad (14)$$
$$= \mathrm{mod}((k_1 \times p_1 + k_2 \times p_2 + \ldots + k_n \times p_n), u)$$

where $k_1, k_2, \ldots, k_n$ correspond to coefficients of the expansion of $(x+1)^{n-1}$. That is, $(x+1)^{n-1}$ is expanded to $k_1 \times x^0 + k_2 \times x^1 + \ldots + k_n \times x^{n-1}$ according to the binomial theorem.

Accordingly, a multi-turn absolute rotation angle calculated value $\theta_1(m^{n-1})$ of the first rotating shaft is calculated by multiplying the periodic signal in Formula (14) by $m^{n-1}$ and is represented as Formula (15).

[Expression 29]

$$\theta_{1(m^{n-1})} = \mathrm{mod}((k_1 \times p_1 + k_2 \times p_2 + \ldots + k_n \times p_n), u) \times m^{n-1} \qquad (15)$$

As shown in Formula (15), the multi-turn rotation angle calculated value $q1(m^{n-1})$ of the first rotating shaft can be obtained by substituting the detected values $p_1$ to $p_n$ from the angle detectors of the respective rotating shafts. In Formula (15), n is the number of shafts to be taken into consideration. If the number n of shafts is set to nmax, a multi-turn absolute rotation angle calculated value $\theta c = \theta_1(m^{nmax-1})$ is calculated.

Note that although the above-described calculations are targeted at a gear mechanism with a change gear ratio of $(m-1)/m$, the present invention can also be applied to a gear mechanism with a change gear ratio of $(m+1)/m$. It is possible to distinguish between a case with a change gear ratio of $(m-1)/m$ and a case with a change gear ratio of $(m+1)/m$ by introducing a sign-adjusting term to the above-described periodic functions in the manner (to be described below).

Periodic functions for a gear mechanism with a change gear ratio of $(m+1)/m$ are obtained in the above-described manner. The obtained periodic functions are as shown below. That is, the angle detected value $p_n$ of the n-th rotating shaft is represented as follows.

$$p_n = \mathrm{mod}\left(\left(-\frac{m+1}{m}\right)^{n-1} \times \theta_1, u\right) \qquad \text{[Expression 30]}$$

Accordingly, the angle detected values $p_1$ to $p_4$ of the first to fourth rotating shafts are obtained in the manner below.

$$p_1 = \mathrm{mod}(\theta_1, u) \qquad \text{[Expression 31]}$$
$$p_2 = \mathrm{mod}\left(\left(-1 - \frac{1}{m}\right) \times \theta_1, u\right)$$
$$p_3 = \mathrm{mod}\left(\left(1 + \frac{2}{m} + \frac{1}{m^2}\right) \times \theta_1, u\right)$$
$$p_4 = \mathrm{mod}\left(\left(-1 - \frac{3}{m} - \frac{3}{m^2} - \frac{1}{m^3}\right) \times \theta_1, u\right)$$

The periodic functions $S(m^1)$ to $S(m^3)$ are obtained as follows.

$$S_{(m^1)} = \mathrm{mod}\left(\frac{1}{m} \times \theta_1, u\right) \qquad \text{[Expression 32]}$$
$$= \mathrm{mod}\left(\mathrm{mod}(\theta_1, u) + \mathrm{mod}\left(\left(-1 - \frac{1}{m}\right) \times \theta_1, u\right) \times (-1), u\right)$$
$$= \mathrm{mod}(p_1 + p_2 \times (-1), u)$$

Since a computation result of $p_1 + p_2$ is $-(1/m)$ in the above formula, $p_1 + p_2$ is multiplied by $-1$.

$$S_{(m^2)} = \mathrm{mod}\left(\frac{1}{m^2} \times \theta_1, u\right) \qquad \text{[Expression 33]}$$
$$= \mathrm{mod}\left(\mathrm{mod}(\theta_1, u) + 2 \times \mathrm{mod}\left(\left(-1 - \frac{1}{m}\right) \times \theta_1, u\right) + \mathrm{mod}\left(\left(1 + \frac{2}{m} + \frac{1}{m^2}\right) \times \theta_1, u\right), u\right)$$
$$= \mathrm{mod}(p_1 + 2p_2 + p_3, u)$$

$$S_{(m^3)} = \mathrm{mod}\left(\frac{1}{m^3} \times \theta_1, u\right) \qquad \text{[Expression 34]}$$
$$= \mathrm{mod}\left(\mathrm{mod}(\theta_1, u) + 3 \times \mathrm{mod}\left(\left(-1 - \frac{1}{m}\right) \times \theta_1, u\right) + 3 \times \mathrm{mod}\left(\left(1 + \frac{2}{m} + \frac{1}{m^2}\right) \times \theta_1, u\right) + \mathrm{mod}\left(\left(-1 - \frac{3}{m} - \frac{3}{m^2} - \frac{1}{m^3}\right) \times \theta_1, u\right) \times (-1), u\right)$$
$$= \mathrm{mod}((p_1 + 3p_2 + 3p_3 + p_4) \times (-1), u)$$

Since a computation result of $p_1 + 3p_2 + 3p_3 + p_4$ is $-(1/m^3)$ in the above formula, $p_1 + 3p_2 + 3p_3 + p_4$ is multiplied by $-1$. As described above, if the change gear ratio is $(m+1)/m$, when n is an even number, a result of a computation in a modulo formula is negative, and a sign-adjusting term $J^{n-1}$ ($J=-1$) is introduced into a periodic function. That is, the periodic function $S(m^{n-1})$ represented as in the formula below.

$$S_{(m^{n-1})} = \mathrm{mod}((k_1 \times p_1 + k_2 \times p_2 + \ldots + k_n \times p_n) \times J^{n-1}, u) \qquad \text{[Expression 35]}$$

In the above formula, J is 1 if the change ratio between adjacent rotating shafts is $-(m-1)/m$ and is $-1$ if the change ratio is $-(m+1)/m$.

For example, assuming here a case where the number of rotating shafts is 4, the number m of teeth is 32 (the number of teeth in a driving rotating shaft is m−1 while the number of teeth in a driven rotating shaft is m), and the unit quantity u is 131072 (u corresponds to a resolution of 17 bits ($=2^{17}$) of the angle detected value $p_1$ from the angle detector S1) in the gear mechanism shown in FIG. 1, Formula (14) is given by:

$$\mod\left(\frac{1}{32^3} \times \theta_1, 131072\right) = \quad \text{[Expression 36]}$$
$$\mod(p_1 + 3p_2 + 3p_3 + p_4, 131072)$$

A rotation angle calculated value $\theta_1(m^3)$ of the first rotating shaft is obtained by Formula (16).

[Expression 37]

$$\theta_{1(m^3)} = \mod((p_1+3p_2+3p_3+p_4), 131072) \times 32768 \quad (16)$$

Accordingly, by detecting the rotation detected values $p_1$ to $p_4$ representing the rotation angles of the first to fourth rotating shafts, multi-turn angle detection of the first rotating shaft whose one cycle corresponds to 32768 (=32) revolutions can be performed with a resolution of 131072 on the basis of Formula (15) above.

Embodiments which detect a multi-turn absolute rotation angle will be described below in detail on the basis of the above-described principle.

Embodiment 1

Figure 2:
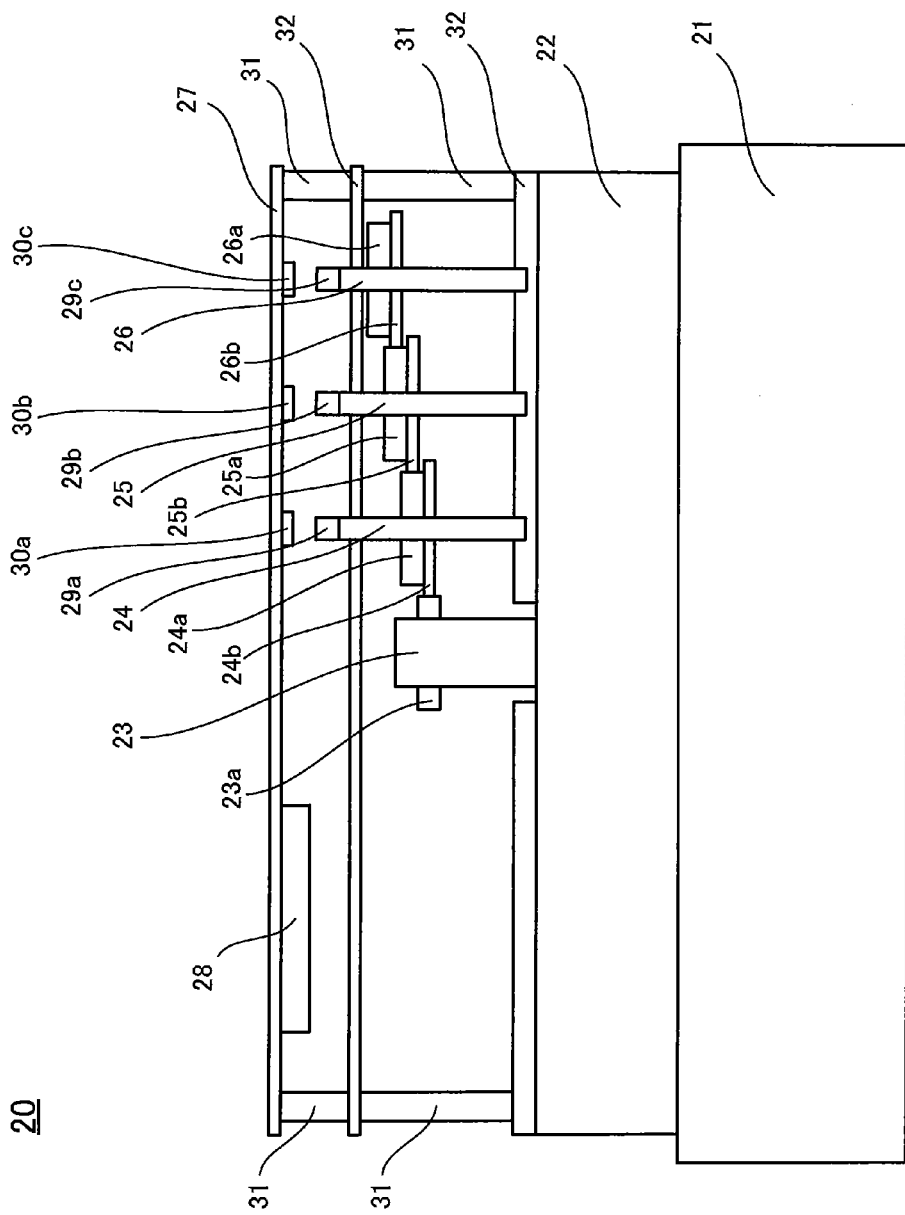
FIG. 2 is a configuration view of a rotation angle detection device for detecting a multi-turn absolute rotation angle that is the first embodiment of the present invention.

FIG. 2 is a configuration view of a rotation angle detection device 20 for detecting a multi-turn absolute rotation angle which is the first embodiment of the present invention. To a first rotating shaft 23 which is provided on the opposite side from an output rotating shaft (not shown) of a servomotor 21, an optical absolute encoder 22 is coupled, and a gear 23a having 31 teeth is fixed. The gear 23a is meshed with a gear 24b which is fixed to a second rotating shaft 24 and has 32 teeth. A gear 24a which is fixed to the second rotating shaft 24 and has 31 teeth is meshed with a gear 25b which is fixed to a third rotating shaft 25 and has 32 teeth. A gear 25a which is fixed to the third rotating shaft 25 and has 31 teeth is meshed with a gear 26b which is fixed to a fourth rotating shaft 26 and has 32 teeth. The gears 24a and 24b, the gears 25a and 25b, and the gears 26a and 26b are each integrally formed resin gears of the same shape and may be formed integrally with the corresponding rotating shaft. As described above, the rotation angle detection device 20 has a structure in which revolution of the servomotor 21 is transmitted from the first rotating shaft 23 to the fourth rotating shaft 26 via a series-connected gear mechanism.

The optical absolute encoder 22 detects an absolute angle $\theta_1$ within one revolution of the first rotating shaft 23 with a resolution of 17 bits ($2^{17}$=131072 p/rev). The optical absolute encoder 22 is electrically connected to a signal processing circuit 28 which is mounted on a printed board 27, and an angle detected value $p_1$ which is a piece of rotation angle information of the first rotating shaft 23 detected by the optical absolute encoder 22 is sent to the signal processing circuit 28.

Magnets 29a, 29b, and 29c which are magnetized to have two poles in the same directions as radial directions of the gears 24a, 25a, and 26a are attached to shaft ends, respectively of the second to fourth rotating shafts 24, 25, and 26 and revolve with shaft revolution. MR rotation angle sensors 30a, 30b, and 30c using MR elements are mounted at positions facing the magnets 29a, 29b, and 29c on the board 27. The MR sensor 30a, 30b, or 30c outputs two sinusoidal voltages which are 90° out of phase with each other for one cycle when the magnet 29a, 29b, or 29c revolves once. The detected voltages detected by the MR sensors 30a, 30b, and 30c are sent to the signal processing circuit 28.

A resin structure 32 which is formed using a spacer 31 holds the above-described second to fourth rotating shafts 24 to 26. Although the first to fourth rotating shafts 23 to 26 shown in FIG. 2 are held in a linear arrangement in the structure 32, for the sake of simplicity of description, center axes of the first to fourth rotating shafts 23 to 26 may be arranged on a curved line for effective utilization of the space in the structure 32.

Figure 3:
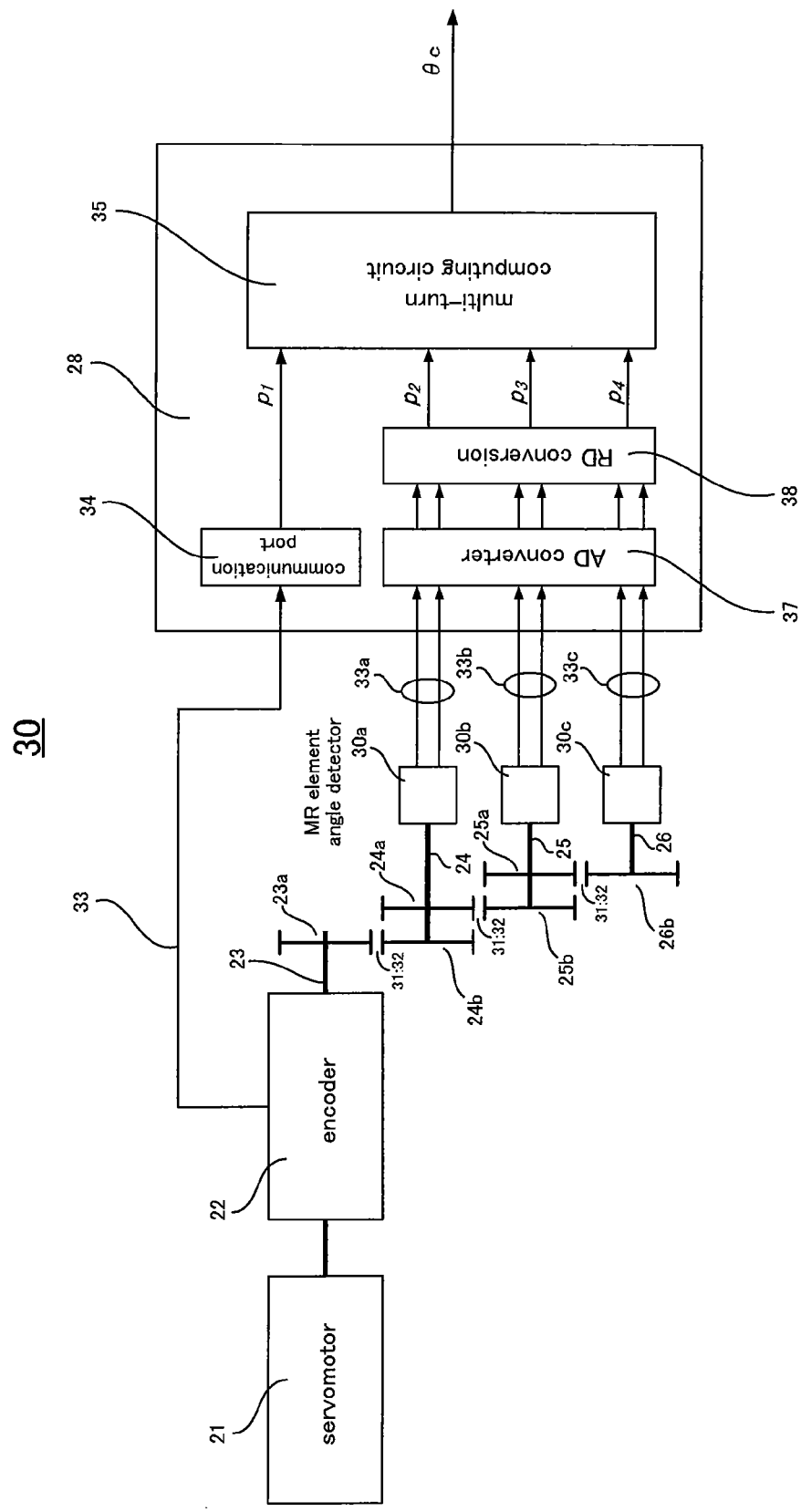
FIG. 3 is a block diagram of a rotation angle detection device for calculating a multi-turn absolute rotation angle of a motor rotating shaft in the first embodiment of the present invention.

FIG. 3 shows a block diagram of a rotation angle detection device 30 for calculating a multi-turn absolute rotation angle θc of the servomotor 21. In FIG. 3, elements same as or similar to the elements shown in FIG. 2 are denoted by same reference numerals.

Referring to FIG. 3, a detected value $p_1$ representing a rotation angle for one cycle of the first rotating shaft 23 that is a rotating shaft of the servomotor 21 is detected by the encoder 22 and is sent to a communication port 34 inside the signal processing circuit 28 via a signal line 33. The detected value $p_1$ output from the encoder 22 has a resolution of 17 bits. The detected value $p_1$ received by the communication port 34 is further sent to a multi-turn computing circuit 35 for calculating an absolute angle of the first rotating shaft 23.

Figure 4:
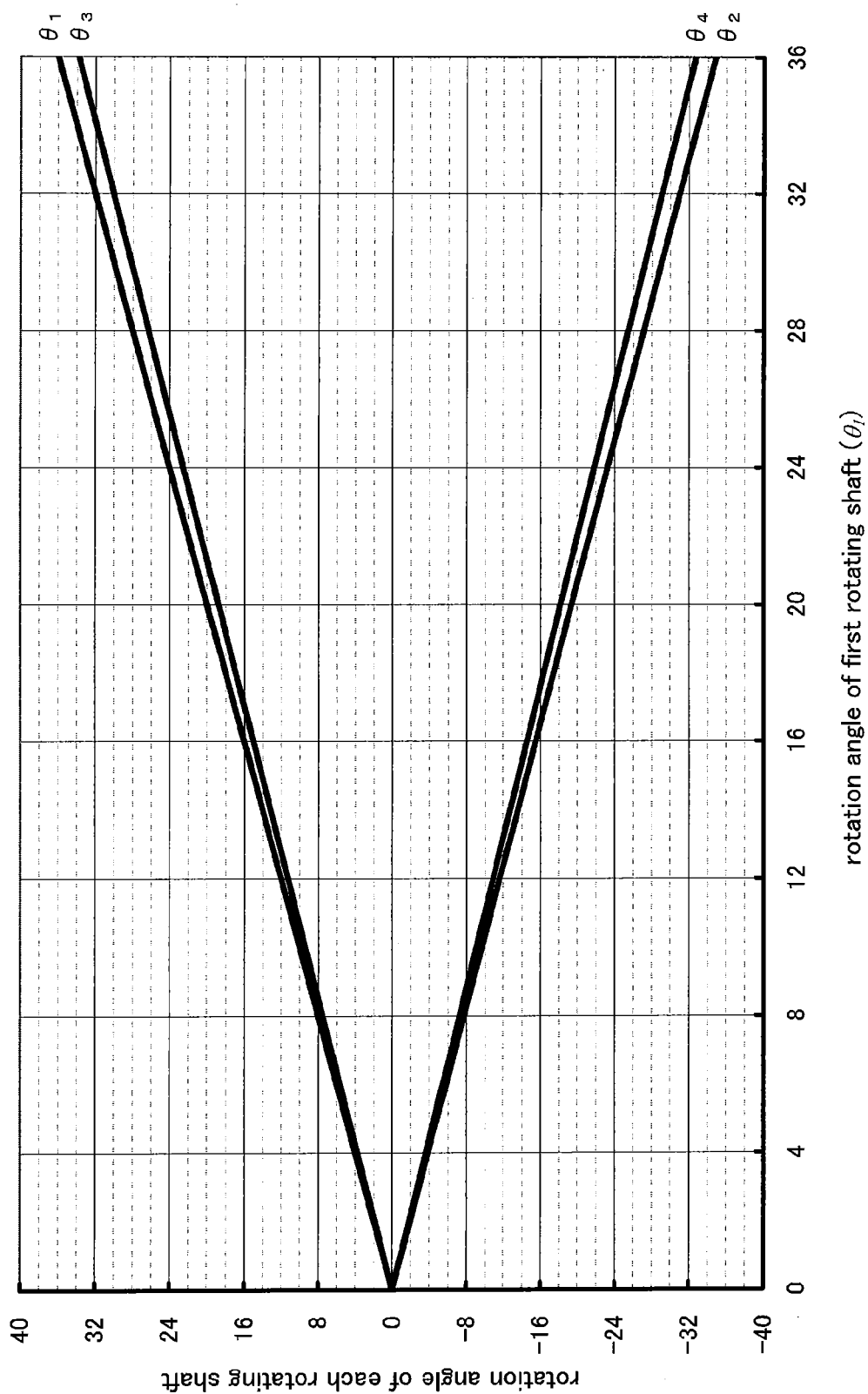
FIG. 4 is a graph showing the relationships between the number of revolutions of a first rotating shaft and first to fourth rotation angles in the first embodiment of the present invention.

Revolution of the first rotating shaft 23 is transmitted to the second to fourth rotating shafts 24 to 26 by the gear mechanism. As regards rotation angles $\theta_1$ to $\theta_4$ of the first to fourth rotating shafts 23 to 26, for example, if m is 32, and a rotation angle is represented as the number of revolutions, the relationships between the number of revolutions of the first rotating shaft and the first to fourth rotation angles $\theta_1$ to $\theta_4$ are as shown in FIG. 4. The abscissa in FIG. 4 represents the number of revolutions of the first rotating shaft while the ordinate represents the rotation angles $\theta_1$ to $\theta_4$ of the respective shafts. Each minus sign on the ordinate indicates that a shaft rotation direction is reverse to that of the first rotating shaft. For example, if the number of revolutions of the first rotating shaft is 32, $\theta_2$ is −31 in the second rotating shaft. This shows that the second rotating shaft revolves 31 times in a direction reverse to that of the first rotating shaft. The relationships are as shown in Formulae (2) to (5).

Figure 5:
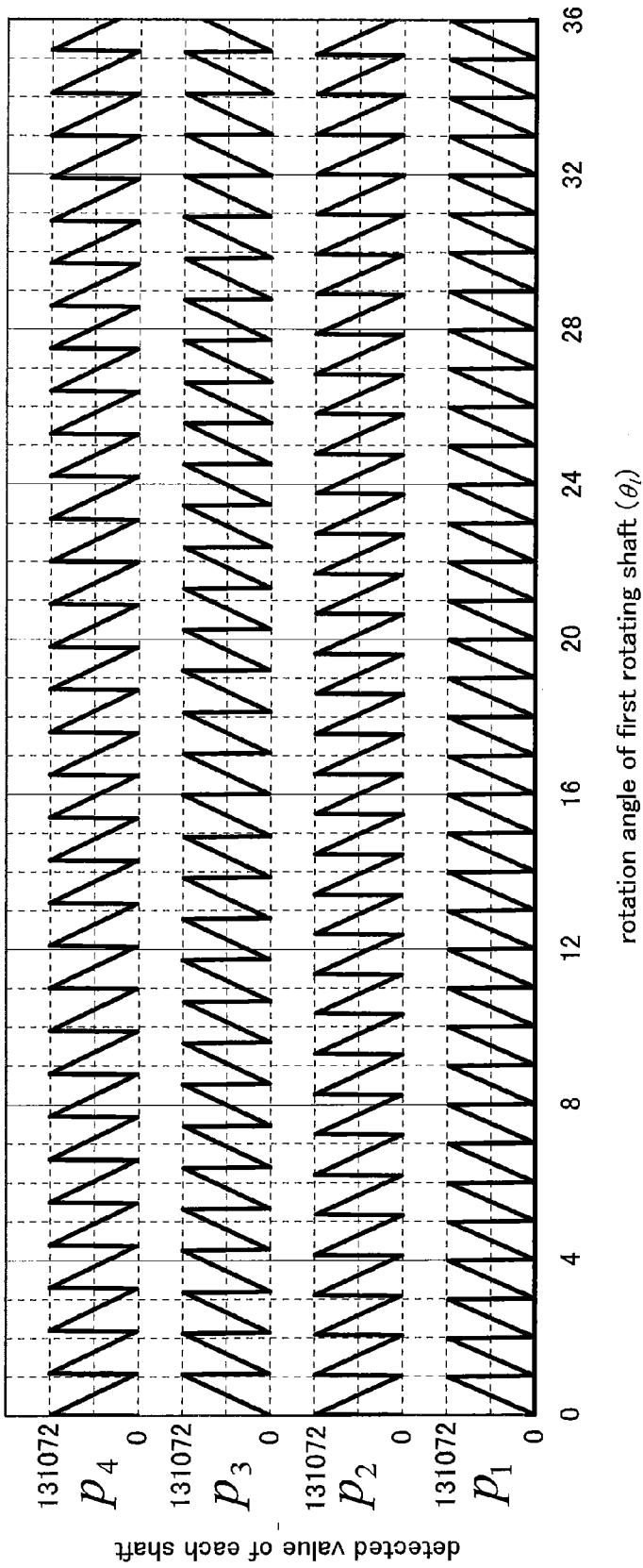
FIG. 5 is a graph showing the relationships between the number of revolutions of the first rotating shaft and detected values $p_1$, $p_2$, $p_3$, and $p_4$ of respective shafts in the first embodiment of the present invention.

Referring back to FIG. 3, the rotation angles of the first to fourth rotating shafts 23 to 26 are detected by the MR element angle detectors 30a, 30b, and 30c, respectively, and two sinusoidal detected voltages (a sin component and a cosin component) 90° out of phase with each other are sent to an AD converter 37 via each of signal lines 33a, 33b, and 33c. The two detected voltages are converted from analog values to, for example, 12-bit digital values by the AD converter 37 and are sent to an RD conversion computing circuit 38. The RD conversion computing circuit 38 calculates an angle from the two received digital values (the sin component and eosin component). Although the angle has a resolution of 12 bits, angle detected values $p_2$, $p_3$, and $p_4$ which have been extended to 17 bits to suit the resolution of the angle detected value $p_1$ from the encoder 22 are obtained. More specifically, a 17-bit angle detected value is obtained by appending 5 bits of 0 to the low-order end of 12 bits. Note that since detected voltages from the MR element angle detectors 30a, 30b, and 30c include errors due to variation among MR elements themselves and various factors such as magnetism, circuits, and machine accuracy, the detected voltages are not converted to angles without any change but are subjected to voltage signal offset correction and amplitude correction and various types of accuracy correction, such as error correction of an actual rotation angle and correction related to the detected values of the respective rotating shafts. The angle detected values $p_2$, $p_3$, and $p_4$ subjected to the processes are sent to the multi-turn computing circuit 35. FIG. 5 shows change in each of the angle detected values $p_1$ to $p_4$ obtained in the above-describe manner with change in the number of revolutions of the first rotating shaft. Note that since the angle detected values $p_1$, $p_2$, $p_3$, and $p_4$ received by the multi-turn computing circuit 35 each have a resolution of 17 bits, the detected value of each shaft changes between 0 and 131072 during each revolution of the shaft, as indicated by the ordinate in FIG. 5.

The multi-turn computing circuit 35 receives the angle detected values $p_1$, $p_2$, $p_3$, and $p_4$ from the communication port 34 and RD conversion computing circuit 38 and substitutes the values into Formula (15). With this operation, the multi-turn computing circuit 35 can calculate and output the multi-turn absolute rotation angle θc when m is 32, the resolution is 17 bits ($2^{17}$=131072), and a multi-turn range is 15 bits ($2^{15}$=32768).

Figure 6:
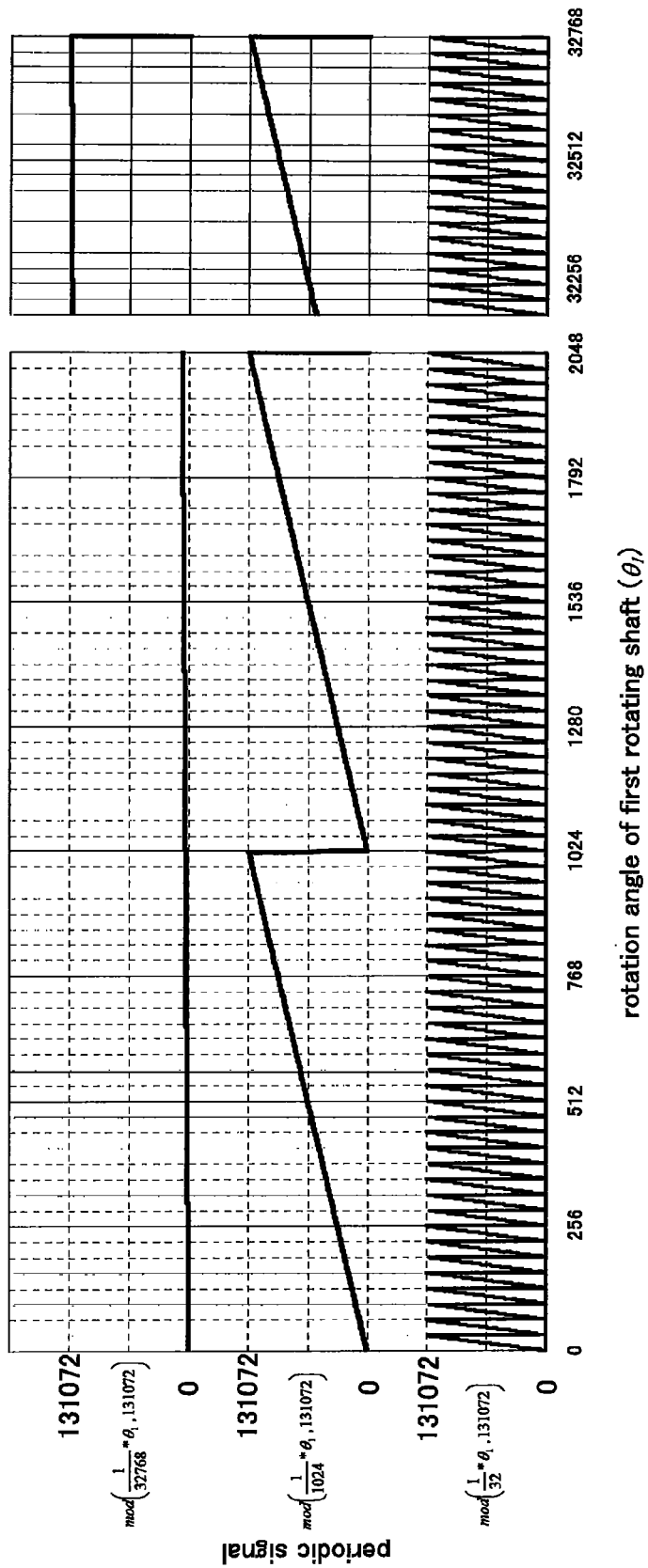
FIG. 6 is a graph showing the relationships of periodic signals with the number of revolutions of the first rotating shaft in the first embodiment of the present invention.

FIG. 6 is a graph representing periodic signals obtained by Formulae (11) to (13). The abscissa represents the number of revolutions, which ranges from 0 to 32768, of the first rotating shaft 23 and is partially omitted for the sake of simplicity. The bottom line in FIG. 6 corresponds to Formula (11) and represents a periodic signal whose one cycle corresponds to 32 revolutions. The bottom line shows that an absolute rotation angle when the number of revolutions of the first rotating shaft 23 ranges from 0 to 32 can be detected from the periodic signal that is obtained by substituting the angle detected values $p_1$ and $p_1$ of the first and second rotating shafts 23 and 24 into Formula (11). The middle line in FIG. 6 corresponds to Formula (12) and represents a periodic signal whose one cycle corresponds to 1024 revolutions. The middle line shows that an absolute rotation angle when the number of revolutions of the first rotating shaft 23 ranges from 0 to 1024 can be detected from the periodic signal that is obtained by substituting the angle detected values $p_1$, $p_2$, and $p_3$ of the first to third rotating shafts 23 to 25 into Formula (12). The top line in FIG. 6 corresponds to Formula (13) and represents a periodic signal whose one cycle corresponds to 32768 revolutions. The top line shows that an absolute rotation angle when the number of revolutions of the first rotating shaft 23 ranges from 0 to 32768 can be detected from the periodic signal that is obtained by substituting the angle detected values $p_1$, $p_2$, $p_3$, and $p_4$ of the first to fourth rotating shafts 23 to 26 into Formula (13).

Embodiment 2

The above-described multi-turn absolute rotation angle detection devices can achieve a wide multi-turn detection range by increasing the number of rotating shafts. However, high accuracy is required for individual angle detectors which measure detected values of rotating shafts to calculate an accurate multi-turn rotation angle calculated value, as will be described below. Generally, detected values measured by angle detectors include errors. What level of errors is tolerable for each angle detector to keep constant the accuracy of a multi-turn rotation angle calculated value of a first rotating shaft will be considered below. For example, a rotation angle calculated value $\theta_1(m^{n-1})$ of a first rotating shaft of a multi-turn absolute rotation angle detection device with n shafts is calculated by multiplying a periodic signal $S(m^1)$ represented by Formula (11) by a rotation angle detection range $m^1$ when the number n of rotating shafts is 2, calculated by multiplying a periodic signal $S(m^2)$ represented by Formula (12) by a rotation angle detection range $m^2$ when the number n is 3, and calculated by multiplying a periodic signal $S(m^3)$ represented by Formula (13) by a rotation angle detection range $m^3$ when the number n is 4, as shown in Formula (15). The calculated values are represented by Formulae (17) to (19).

If the number of shafts is 2,

[Expression 38]

$$\theta_{1(m^1)} = \mod(p_1+p_2,1) \times m^1 \quad (17)$$

if the number of shafts is 3,

[Expression 39]

$$\theta_{1(m^2)} = \mod(p_1+2p_2+p_3,1) \times m^2 \quad (18)$$

If the number of shafts is 4,

[Expression 40]

$$\theta_{1(m^3)} \mod(p_1+3p_2+3p_3+p_4,1) \times m^3 \quad (19)$$

In Formulae (17) to (19), m is the number of teeth of the first rotating shaft. A unit quantity u in Formulae (11) to (13) is set to 1. That is, each frequency function takes a value ranging from 0 to 1 according to a rotation angle of the first rotating shaft.

Let $e_n$ be an absolute value of a detection error in each rotating shaft. In order for the accuracy of the rotation angle calculated value $\theta_1(m^{n-1})$ of the first rotating shaft to be kept not more than one revolution (±0.5 rev), the absolute value $e_n$ needs to satisfy Formulae (20) to (22) below.

If the number of shafts is 2,

[Expression 41]

$$e_1 + e_2 < \frac{1}{2m^1} \quad (20)$$

If the number of shafts is 3,

[Expression 42]

$$e_1 + 2e_2 + e_3 < \frac{1}{2m^2} \quad (21)$$

If the number of shafts is 4,

[Expression 43]

$$e_1 + 3e_2 + 3e_3 + e_4 < \frac{1}{2m^3} \quad (22)$$

Assuming that the detection errors in the rotating shafts are substantially equal and are e, the detection errors need to fall within one of the ranges below.

If the number of shafts is 2,

[Expression 44]

$$e < \frac{1}{4m^1} \quad (23)$$

If the number of shafts is 3,

[Expression 45]

$$e < \frac{1}{8m^2} \quad (24)$$

If the number of shafts is 4,

[Expression 46]

$$e < \frac{1}{16m^3} \quad (25)$$

By deduction of an error range when the number of shafts is n from Formulae (23) to (25), the error range is represented as in Formula (26) below.

[Expression 47]

$$e < \frac{1}{2^n m^{n-1}} \quad (26)$$

As can be understood from Formula (26), although increase in the number n of shafts widens a multi-turn detection range, the increase also exponentially increases detection accuracy required for an angle detector of each rotating shaft. Requiring each angle detector to have desired high detection accuracy causes rise in the cost of a multi-turn detection device. There is thus a need for computation processing for obtaining a multi-turn rotation angle which reduces the effect of detection errors in angle detectors while lowering detection accuracy required for the angle detectors of respective rotating shafts.

A calculation method for obtaining a multi-turn angle calculated value which reduces the effect of detection errors in angle detectors, will be described below using a transmission mechanism 10 shown in FIG. 1. Generally, an integer I can be expanded to a sequence of powers of m, $m_n$. More specifically, letting k be an integer ranging from 0 to n and $a_i$ be an integer within the range $0 \leq a_k < n$, the integer I can be expressed as $I = a_0 m^0 + a_1 m^1 + a_2 m^2 + \ldots + a_i m^i + \ldots + a_n m^n$. For example, if m is 10, the integer 1056 can be expanded to $6 \times 10^0 + 5 \times 10^1 + 0 \times 10^2 + 1 \times 10^3$. The expression is called a decimal number. In the following description, a part corresponding to the number of revolutions of a multi-turn absolute rotation angle uses expanded base-m notation.

Referring to FIG. 1, a multi-turn absolute rotation angle of a first rotating shaft 11 can be mathematically expressed using the sum of an angle detected value $p_1$ within one revolution of the first rotating shaft 11 and the number of multi-turn revolutions of the first rotating shaft 11. If the number of multi-turn revolutions is represented in base-m notation (the reason for which will be explained later), a multi-turn rotation angle calculated value $\theta_1(m^{n-1})'$ (also denoted by θc) of the first rotating shaft can be expressed by a rotation angle calculation formula in Formula (27) below.

[Expression 48]

$$\theta'_{1(m^{n-1})} = p_1 + (R_0 \times m^0 + R_1 \times m^1 + R_2 \times m^2 + \ldots + R_{n-2} \times m^{n-2}) \times u \quad (27)$$

$$= p_1 + \sum_{i=2}^{n} (R_{i-2} \times m^{i-2}) \times u$$

where m corresponds to the number of teeth of the first rotating shaft, n is the number of shafts, coefficients $R_0$ to $R_{n-2}$ are integers ranging from 0 to m−1 inclusive ($0 \leq R_0$ to $R_{n-2} < m$), and u is a base unit quantity. In the structure of the transmission mechanism 10 shown in FIG. 1, since a multi-turn detection range increases m-fold for every one rotating shaft increase, it is convenient to express a part corresponding to the number of multi-turn revolutions in Formula (27) in base-m notation.

A multi-turn rotation angle calculated value $\theta_1(m^{n-1})$ of the first rotating shaft 11 is obtained by substituting detected values $p_1$ to $p_n$ detected for respective rotating shafts into Formula (15). In essence, the rotation angle calculated value $\theta_1(m^{n-1})$ and the rotation angle calculated value $\theta_1(m^{n-1})'$ can be made substantially equal by appropriately selecting the coefficients $R_0$ to $R_{n-2}$. That is, if the coefficients $R_0$ to $R_{n-2}$ are appropriately selected such that a part corresponding to the number of multi-turn revolutions of the rotation angle calculated value $\theta_1(m^{n-1})'$ is equal to a part corresponding to the number of revolutions of the rotation angle calculated value $\theta_1(m^{n-1})$, a rotation angle calculated value error included in the rotation angle calculated value $\theta_1(m^{n-1})'$ can be limited to a detection error resulting from the detected value $p_1$ of the first rotating shaft. A method for calculating the coefficients $R_0$ to $R_{n-2}$ will be described below in order to obtain the rotation angle calculated value $\theta_1(m^{n-1})'$ from the detected values $p_1$ to $p_n$ detected by detectors of the respective rotating shafts.

For the sake of simplicity of description, assume that the number nmax of rotating shafts is 4, the number m of teeth of the first rotating shaft is 4, and the base unit quantity u is 1 in the transmission mechanism 10 shown in FIG. 1. In this case, the rotation angle calculated value $\theta_1(m^{n-1})'$ of the first rotating shaft can be expressed on the basis of Formula (27) as in Formula (28) below.

[Expression 49]

$$\theta'_{1(4^{4-1})} = p_1 + R_0 \times 4^0 + R_1 \times 4^1 + R_2 \times 4^2 \quad (28)$$

$$= p_1 + R_0 \times 1 + R_1 \times 4 + R_2 \times 16$$

A method for calculating the coefficients $R_0$ to $R_2$ under the above-described conditions will be described.

As can be seen from the relationship shown in Formula (1), a rotation angle $\theta_1$ of the first rotating shaft has relationships shown in Formulae (29) to (31) below with rotation angles $\theta_2$, $\theta_3$, and $\theta_4$, respectively, of second, third, and fourth rotating shafts.

[Expression 50]

$$\theta_2 = -\frac{3}{4} \times \theta_1 \quad (29)$$

$$\theta_3 = \frac{9}{16} \times \theta_1 \quad (30)$$

$$\theta_4 = -\frac{27}{64} \times \theta_1 \quad (31)$$

Figure 7:
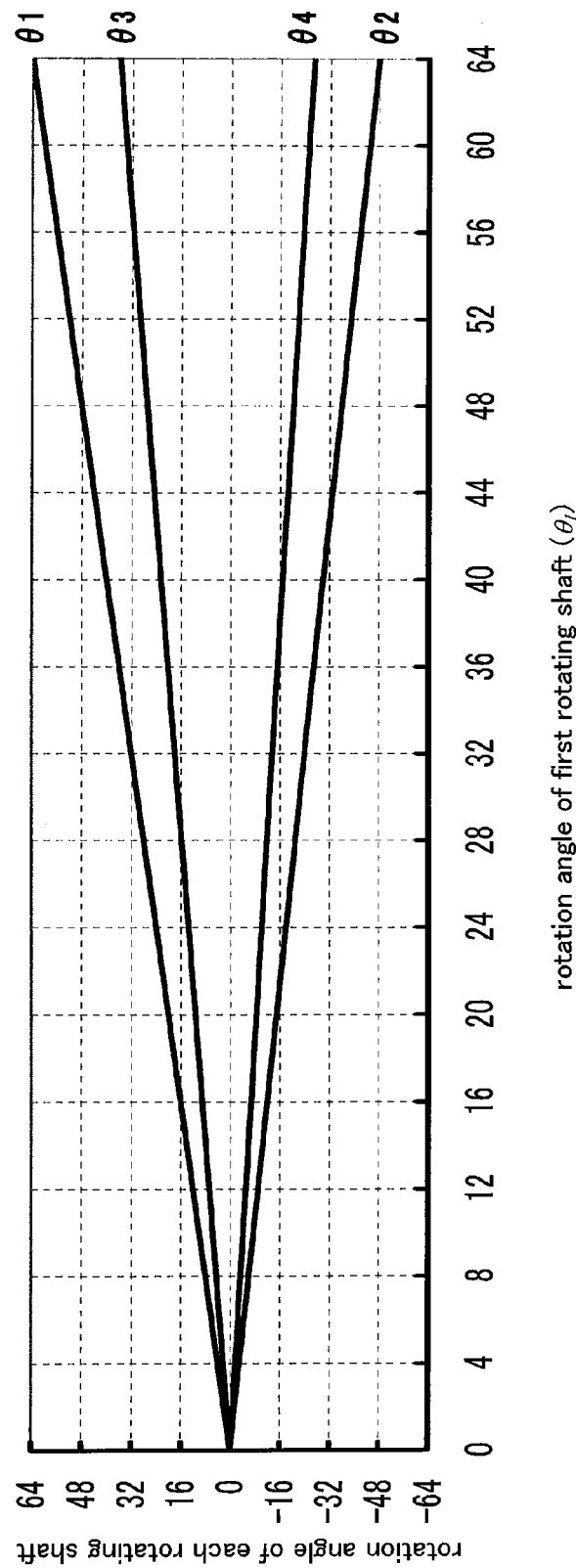
FIG. 7 is a graph showing the relationship between a rotation angle of a first rotating shaft and rotation angles of respective shafts in a second embodiment of the present invention.

Accordingly, the rotation angles $\theta_2$, $\theta_3$, and $\theta_4$ of the second, third, and fourth rotating shafts with respect to the rotation angle $\theta_1$ of the first rotating shaft are shown in FIG. 7.

The detected value $p_n$ indicates a detected value within one revolution in an n-th rotating shaft (since the base unit quantity u is 1 in this example, the value ranges from 0 to 1). Although a rotation angle $\theta_n$ and the detected value $p_n$ of the n-th rotating shaft are strictly as shown in Formula (6), $p_n$ is actually substantially equal to $\text{mod}(\theta_n, u)$ due to an error included in a corresponding angle detector. Accordingly, as for the detected values $p_1$, $p_2$, $p_3$, and $p_4$ of the respective rotating shafts, if Formulae (29) to (31) above are substituted into the rotation angles $\theta_2$, $\theta_3$, and $\theta_4$ of the respective rotating shafts, the relationships of the rotation angle $\theta_1$ of the first rotating shaft with the detected values $p_1$, $p_2$, $p_3$, and $p_4$ of the respective rotating shafts are as shown in Formulae (32) to (35) below.

[Expression 54]

$$p_1 \approx \mod(\theta_1, 1) \tag{32}$$

$$p_2 \approx \mod(\theta_2, 1) = \mod\left(-\frac{3}{4}\times\theta_1, 1\right) \tag{33}$$

$$p_3 \approx \mod(\theta_3, 1) = \mod\left(\frac{9}{16}\times\theta_1, 1\right) \tag{34}$$

$$p_4 \approx \mod(\theta_4, 1) = \mod\left(-\frac{27}{64}\times\theta_1, 1\right) \tag{35}$$

Figure 8:
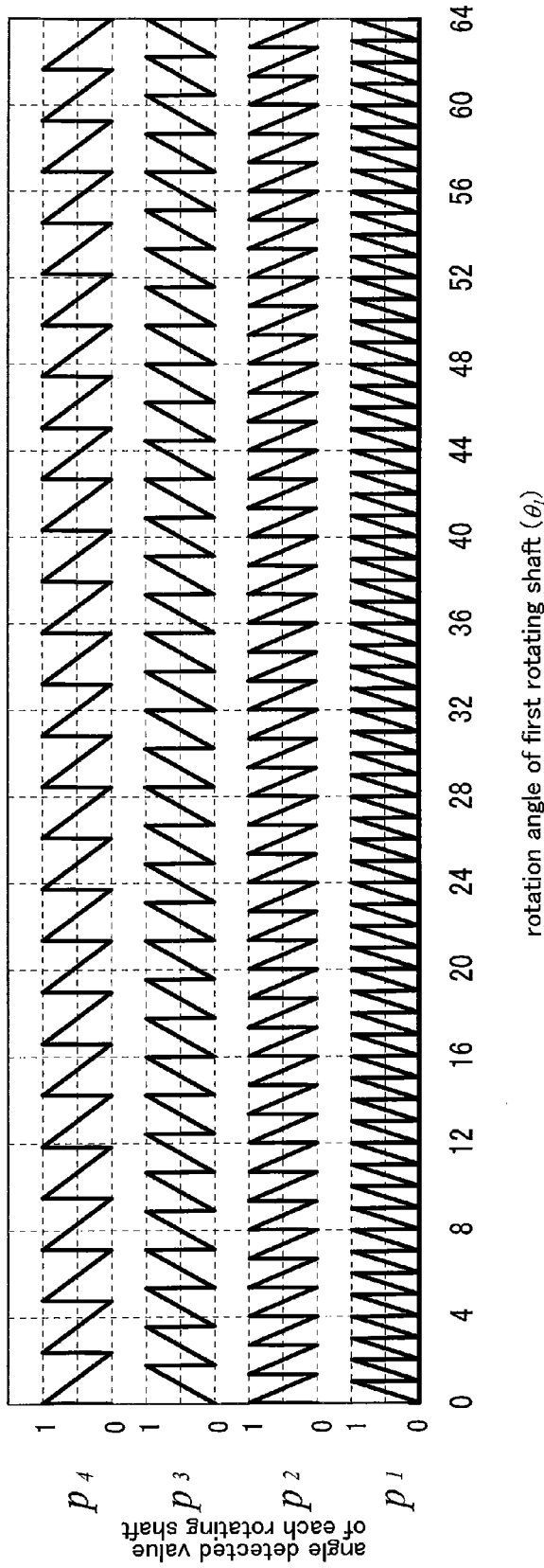
FIG. 8 shows angle detected values output from angle detectors of the respective shafts with respect to the rotation angle of the first rotating shaft in the second embodiment of the present invention.

Accordingly, the detected values $p_1$, $p_2$, $p_3$, and $p_4$ of the respective rotating shafts with respect to the rotation angle $\theta_1$ of the first rotating shaft are shown in FIG. 8.

If an error is not included in the angle detected value $p_n$, a periodic signal $S(m^{n-1})$ has a relationship shown in Formula (14). If the periodic signal $S(m^{n-1})$ is obtained using the angle detected value $p_n$ including an error, such errors affect computation, which leads to error enlargement. Since the rotation angle calculated value $\theta_1(m^{n-1})'$ obtained by Formula (27) does not include an error in the terms other than the angle detected value $p_1$ of the first rotating shaft, an angle corrected value $p_n'$ which is calculated by an angle corrected value calculation formula in Formula (36) below and does not include an error is used to calculate the periodic signal $S(m^{n-1})$, instead of the angle detected value $p_n$ including an error.

[Expression 52]

$$p_n' = \mod\left(\left(-\frac{m+1}{m}\right)^{n-1}\times\theta_{1(m^{n-1})}, u\right) \tag{36}$$

The relationship between angle corrected values of the respective rotating shafts and the periodic signal is represented as in Formula (37) below.

[Expression 53]

$$S_{(m^{n-1})}=\mod((k_1\times p_1 + k_2\times p_2' + k_3\times p_3' \ldots k_{n-1}\times p_{n-1}' + k_n\times p_n)\times J^{n-1}, u) \tag{37}$$

where angle corrected values $p_2'$ to $p_{n-1}'$ are corrected values for the angle detected values $p_2$ to $p_{n-1}$, and J is a sign-adjusting term which is 1 if the change ratio between adjacent rotating shafts is $-(m-1)/m$ and is $-1$ if the change ratio is $-(m+1)/m$.

When periodic signals $S(m^1)$, $S(m^2)$, and $S(m^3)$ whose one cycles correspond to 4 ($=m^1$), 16 ($=m^2$), and 64 ($=m^3$) revolutions of the first rotating shaft are obtained from Formulae (11) to (13) with the angle corrected value $p_n'$ in mind, the periodic signals are expressed as in Formulae (38) to (41) below. Note that a periodic signal $S(m^0)$ of the first rotating shaft is the angle detected value $p_1$ itself. Since the relationship $\mod(a,c)+\mod(b,c)=\mod((a+b),c)$ and the relationship $b\times\mod(a,c)=\mod(a\times b,c)$ hold in modulo calculation, the periodic signals $S(m^1)$ to $S(m^3)$ are deformed in the manners as in Formulae (38) to (41) below.

[Expression 54]

$$S_{(m^0)} = p_1 \tag{38}$$
$$\approx \mod(\theta_1, 1)$$

$$S_{(m^1)} = \mod(p_1 + p_2', 1) \tag{39}$$
$$\approx \mod\left(\mod(\theta_1, 1) + \mod\left(-\frac{3}{4}\times\theta_1, 1\right), 1\right)$$
$$\approx \mod\left(\frac{1}{4}\times\theta_1, 1\right)$$

$$S_{(m^2)} = \mod(p_1 + 2p_2' + p_3, 1) \tag{40}$$
$$\approx \mod\left(\mod(\theta_1, 1) + 2\times\mod\left(-\frac{3}{4}\times\theta_1, 1\right) + \mod\left(\frac{9}{16}\times\theta_1, 1\right), 1\right)$$
$$\approx \mod\left(\frac{1}{16}\times\theta_1, 1\right)$$

$$S_{(m^3)} = \mod(p_1 + 3p_2' + 3p_3' + p_4, 1) \tag{41}$$
$$\approx \mod\left(\mod(\theta_1, 1) + 3\times\mod\left(-\frac{3}{4}\times\theta_1, 1\right) + 3\times\mod\left(\frac{9}{16}\times\theta_1, 1\right), 1\right) + \mod\left(-\frac{27}{64}\times\theta_1, 1\right), 1\right)$$
$$\approx \mod\left(\frac{1}{64}\times\theta_1, 1\right)$$

Figure 9:
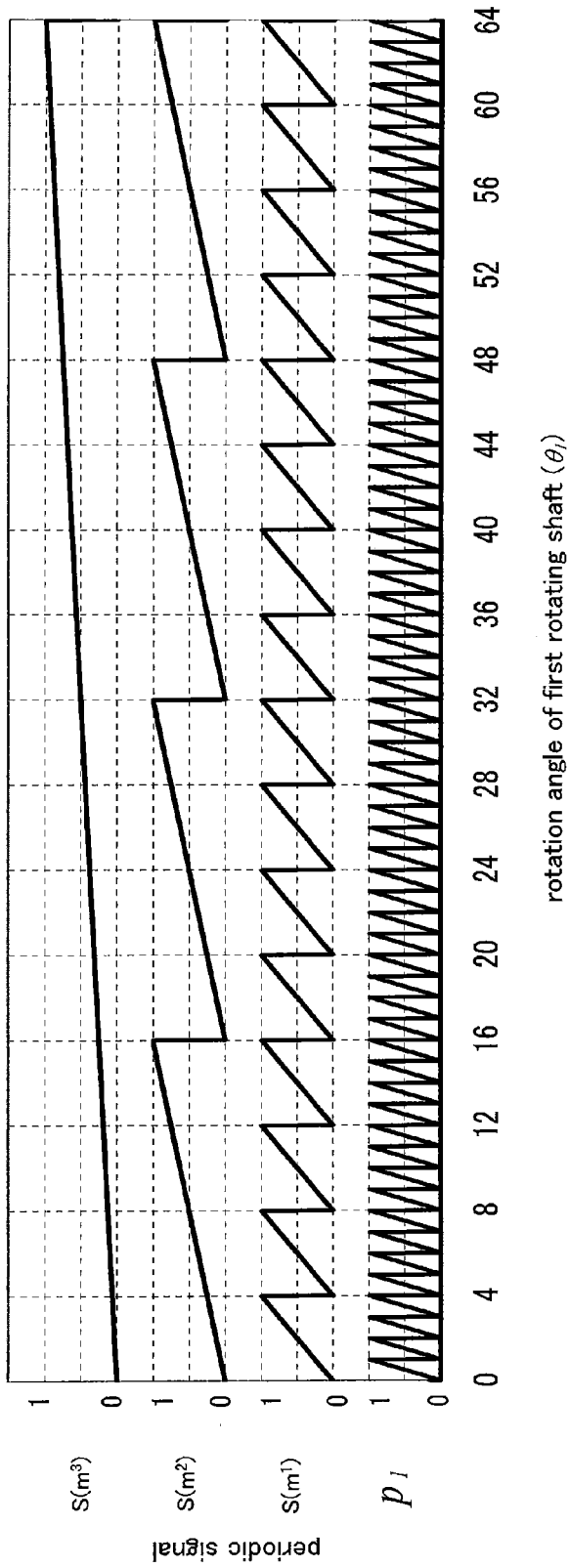
FIG. 9 is a graph showing the relationships of periodic signals with the rotation angle of the first rotating shaft in the second embodiment of the present invention.

Accordingly, the relationships of the periodic functions $S(m^1)$, $S(m^2)$, and $S(m^3)$ with the rotation angle $\theta_1$ of the first rotating shaft are shown in FIG. 9. As shown in FIG. 9, the periodic signal $S(m^1)$ has a sawtooth waveform which increases monotonically from 0 to 1 for every 4 increase in the rotation angle of the first rotating shaft, the periodic signal $S(m^2)$ has a sawtooth waveform which increases monotonically from 0 to 1 for every 16 increase in the rotation angle, and the periodic signal $S(m^3)$ has a sawtooth waveform which increases monotonically from 0 to 1 for every 64 increase in the rotation angle.

From the nature of the above-described periodic signals, the rotation angle calculated value $\theta_1(m^{n-1})$ of the first rotating shaft when the number of revolutions ranges to $m^{n-1}$ can be calculated by multiplying the periodic function $S(m^{n-1})$ by $m^{n-1}$, as in Formula (42) below.

[Expression 55]

$$\theta_{1(m^{n-1})}=S_{(m^{n-1})}\times m^{n-1} \tag{42}$$

Accordingly, the relationships between the periodic function and the rotation angle $\theta_1(m^{n-1})$ of the first rotating shaft when n is 1 to 4 are represented by Formulae (43) to (46).

[Expression 56]

$$\theta_{1(m^0)} = S_{(m^0)}\times m^0 \approx p_1 = \mod(\theta_1, 1) \tag{43}$$

$$\theta_{1(m^1)} = S_{(m^1)}\times m^1 \approx \mod\left(\frac{1}{4}\theta_1, 1\right)\times 4 = \mod(\theta_1, 4) \tag{44}$$

$$\theta_{1(m^2)} = S_{(m^2)}\times m^2 \approx \mod\left(\frac{1}{16}\theta_1, 1\right)\times 16 = \mod(\theta_1, 16) \tag{45}$$

$$\theta_{1(m^3)} = S_{(m^3)}\times m^3 \approx \mod\left(\frac{1}{64}\theta_1, 1\right)\times 64 = \mod(\theta_1, 64) \tag{46}$$

Formula (44) indicates a sawtooth waveform which changes from 0 to 4 for every 4 revolutions of the first rotating shaft. Formula (45) indicates a sawtooth waveform which changes from 0 to 16 for every 16 revolutions of the first rotating shaft. Formula (46) indicates a sawtooth waveform which increases monotonically from 0 to 64 for every 64 revolutions of the first rotating shaft.

A calculation method for calculating the coefficients $R_0$ to $R_{n-2}$ shown in Formula (27) from the above-described relational expressions will be described. Since the coefficients $R^0$ to $R^{n-2}$ in Formula (42) take only natural numbers, the rotation angle calculated value $\theta_1(m^{n-1})^1$ shown in Formula (27) and the rotation angle calculated value $\theta_1(m^{n-1})$ shown in Formula (42) are not completely consistent with each other but approximate each other. That is, following Formula (47):

[Expression 57]

$$\theta_{1(m^{n-1})} \approx \theta_{1(m^{n-1})}' \tag{47}$$

holds.

When Formula (27) is substituted into the rotation angle calculated value $\theta_1(m^{n-1})'$ in Formula (47), Formula (48) below is derived.

[Expression 58]

$$\theta_{1(m^{n-1})} \approx p_1 + (R_0 \times m^0 + R_1 \times m^1 + R_2 \times m^2 + \ldots + R_{n-2} \times m^{n-2}) \times u \tag{48}$$

Rotation angle calculated values $\theta_1(m^0)'$, $\theta_1(m^1)'$, $\theta_1(m^2)'$, and $\theta_1(m^3)'$ when n=1 to 4 are represented as in Formulae (49) to (52) below.

[Expression 59]

$$\theta'_{1(m^0)} = p_1 \tag{49}$$

$$\theta'_{1(m^1)} = p_1 + (R_0 \times m^0) \times u \tag{50}$$
$$= \theta'_{1(m^0)} + R_0 \times m^0 \times u$$

$$\theta'_{1(m^2)} = p_1 + (R_0 \times m^0 + R_1 \times m^1) \times u \tag{51}$$
$$= \theta'_{1(m^1)} + R_1 \times m^1 \times u$$

$$\theta'_{1(m^3)} = p_1 + (R_0 \times m^0 + R_1 \times m^1 + R_2 \times m^2) \times u \tag{52}$$
$$= \theta'_{1(m^2)} + R_2 \times m^2 \times u$$

By deduction from the relationships shown in Formulae (49) to (52), the rotation angle calculated value $\theta_1(m^{n-1})'$ is expressed as in Formula (53) below.

[Expression 60]

$$\theta_{1(m^{n-1})}' = \theta_{1(m^{n-2})}' + R_{n-2} \times m^{n-2} \times u \tag{53}$$

In consideration of the fact that the rotation angle calculated value $\theta_1(m^{n-1})'$ is substantially equal to the rotation angle calculated value $\theta_1(m^{n-1})$, Formula (54) below is obtained from the relationships in Formulae (47) and (53) above. The coefficient $R_{n-2}$ is determined in the manner as described below by selecting the coefficient $R_{n-2}$ satisfying the relationship in Formula (54).

[Expression 61]

$$\theta_{1(m^{n-1})} \approx \theta_{1(m^{n-1})}' = \theta_{1(m^{n-2})}' + R_{n-2} \times m^{n-2} \times u \tag{54}$$

When $\theta_1(m^{n-2})'$ in the right-hand side of Formula (54) is first moved to the left-hand side, Formula (55) is obtained.

[Expression 62]

$$\theta_{1(m^{n-1})} - \theta_{1(m^{n-2})}' \approx R_{n-2} \times m^{n-2} \times u \tag{55}$$

Assuming that n is 2 and the base unit quantity u is 1,

[Expression 63]

$$\theta_{1(m^1)} - \theta_{1(m^0)}' \approx R_0 \times m^0 \tag{56}$$

is obtained. On the basis of the relationship shown in Formula (44), $\mathrm{mod}(\theta_1, 4)$ is substituted for $\theta_1(m^1)$. Additionally, since $\theta_1(m^0)'$ is substantially equal to $\theta_1(m^0)$, as shown in Formula (47), $\mathrm{mod}(\theta_1, 1)$ shown in Formula (43) is substituted into Formula (56). In this case,

[Expression 64]

$$R_0 \times m^0 = R_0 = \mathrm{mod}(\theta_1, 4) - \mathrm{mod}(\theta_1, 1) \tag{57}$$

holds. Note that m is 4.

Figure 10:
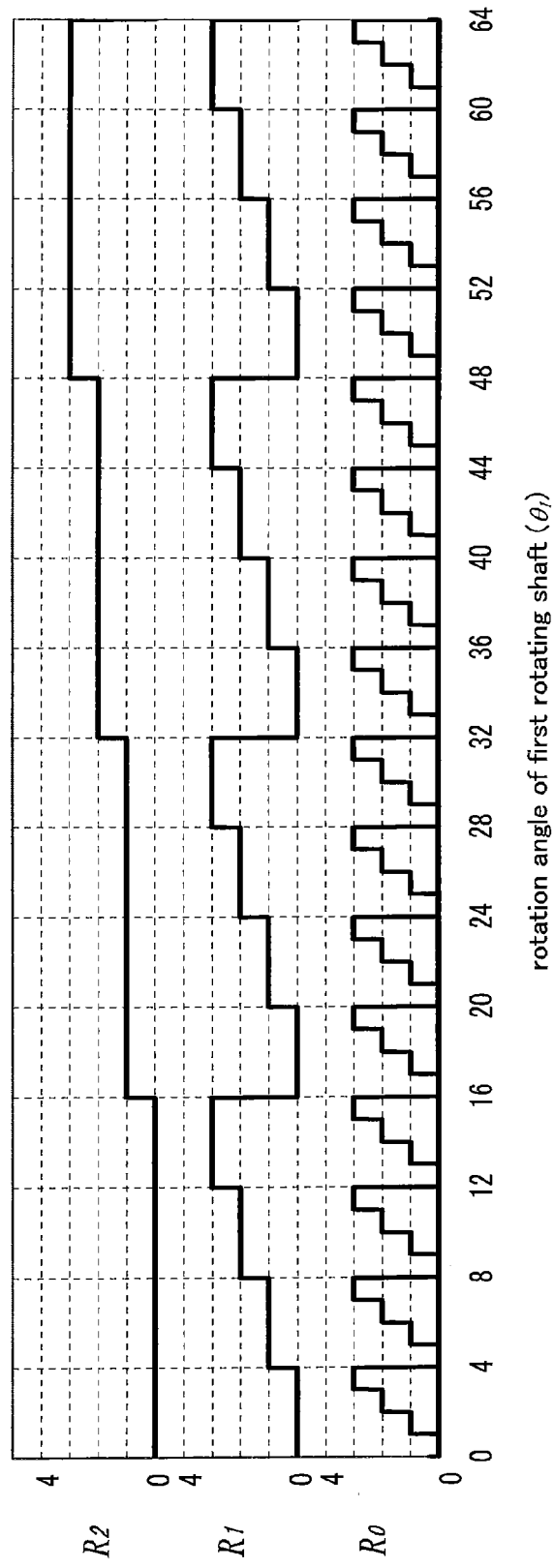
FIG. 10 is a graph showing the relationships between the rotation angle of the first rotating shaft and coefficients $R_0$ to $R_2$ in the second embodiment of the present invention.

In Formula (57), $\mathrm{mod}(\theta_1, 4)$ has sawtooth waves with a period of 4 which rise from 0 to 4 while $\mathrm{mod}(\theta_1, 1)$ has sawtooth waves with a period of 1 which rise from 0 to 1. Accordingly, the coefficient $R_0$ in Formula (57) forms a stepped waveform which has a period of 4 and three steps with a height of 1, as shown at the bottom of FIG. 10.

When u and n are set to 1 and 3, respectively, in Formula (54), and processing as described above is performed,

[Expression 65]

$$R_1 \times m^1 = \mathrm{mod}(\theta_1, 16) - \mathrm{mod}(\theta_1, 4) \tag{58}$$
$$R_1 = \frac{\mathrm{mod}(\theta_1, 16) - \mathrm{mod}(\theta_1, 4)}{4}$$

holds.

In Formula (58), $\mathrm{mod}(\theta_1, 16)$ has sawtooth waves with a height of 16 and a period of 16 while $\mathrm{mod}(\theta_1, 4)$ has sawtooth waves with a height of 4 and a period of 4. Accordingly, the coefficient $R_1$ shown in Formula (58) forms a stepped waveform which has a period of 16 and three steps with a height of 1, as shown in the middle of FIG. 10.

When u and n are set to 1 and 4, respectively, in Formula (54), and processing as described above is performed,

[Expression 66]

$$R_2 \times m^2 = \mathrm{mod}(\theta_1, 64) - \mathrm{mod}(\theta_1, 16) \tag{59}$$
$$R_2 = \frac{\mathrm{mod}(\theta_1, 64) - \mathrm{mod}(\theta_1, 16)}{16}$$

holds.

In Formula (59), $\mathrm{mod}(\theta_1, 64)$ has sawtooth waves with a height of 64 and a period of 64 while $\mathrm{mod}(\theta_1, 16)$ has sawtooth waves with a height of 16 and a period of 16. Accordingly, the coefficient $R_2$ in Formula (59) forms a stepped waveform which has a period of 64 and three steps with a height of 1, as shown at the top of FIG. 10.

Figure 11:
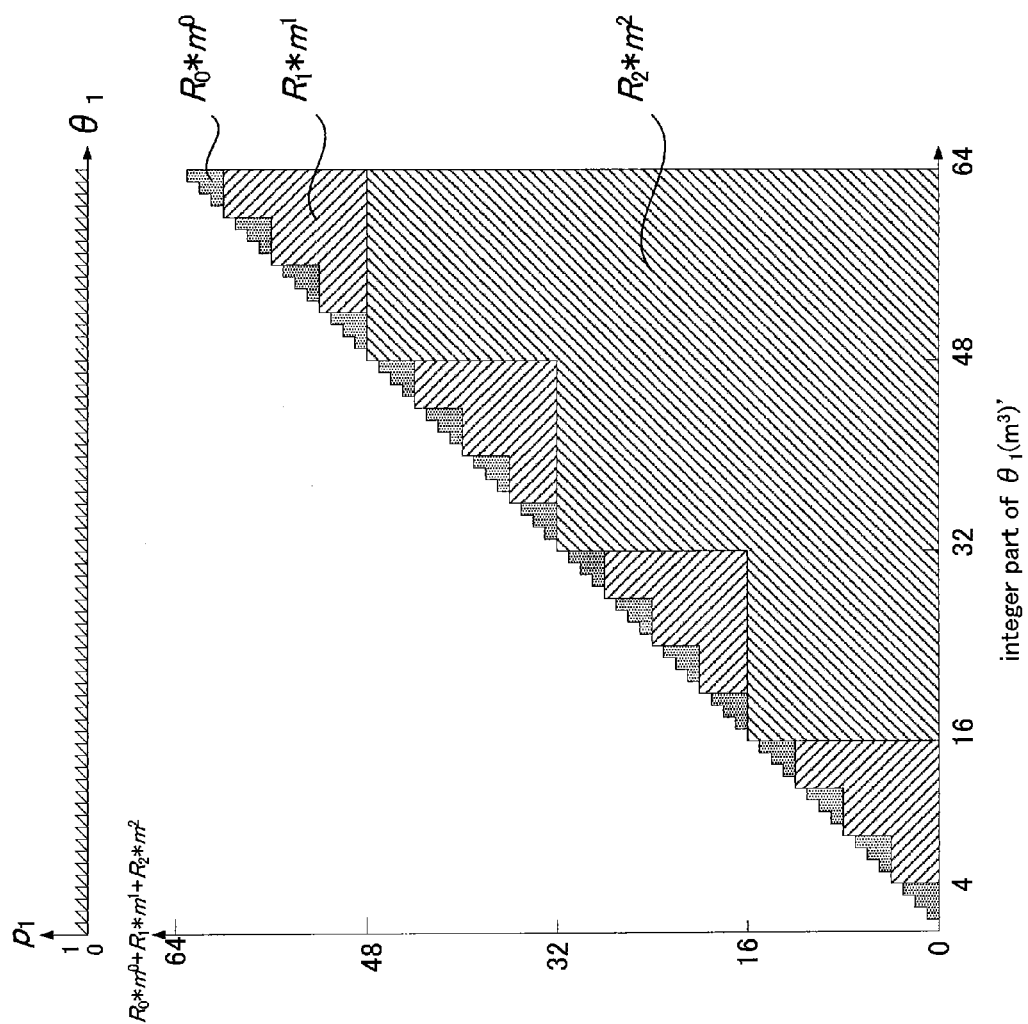
FIG. 11 is a graph for explaining the configuration of an integer part of a rotation angle calculated value of the first rotating shaft in the second embodiment of the present invention.

An integer part of the rotation angle calculated value $\theta_1(m^3)'$ calculated by Formula (28) is the sum of values obtained by multiplying the coefficients $R_0$ to $R_2$ by 1, 4, and 16, respectively. The waveform of the integer part is as shown in FIG. 11. That is, the rotation angle calculated value $\theta_1(m^3)'$ is obtained by adding the angle detected value $p_1$ of the first rotating shaft to the integer part.

When the coefficient $R_{n-2}$ is to be derived from Formula (54), Formula (54) is deformed as in Formula (60) below.

[Expression 67]

$$R_{n-2} \approx \frac{\theta_{1(m^{n-1})} - \theta'_{1(m^{n-2})}}{m^{n-2} \times u} \quad (60)$$

If u is 1, and n is 2 to 4, the coefficients $R_0$ to $R_2$ are given by the formulae below.

[Expression 68]

$$R_0 \approx \frac{\theta_{1(m^1)} - \theta'_{1(m^0)}}{1} \quad (61)$$

$$R_1 \approx \frac{\theta_{1(m^2)} - \theta'_{1(m^1)}}{4} \quad (62)$$

$$R_2 \approx \frac{\theta_{1(m^3)} - \theta'_{1(m^2)}}{16} \quad (63)$$

Since the coefficients $R_0$ to $R_{n-2}$ are integers, the integer as the coefficient $R_{n-2}$ can be calculated by, for example, adding 0.5 to the right-hand side of Formula (60) and dropping a fractional part, as shown in Formula (64) below. When $S(m^{n-1}) \times m^{n-1}$ (Formula (42)) is substituted for $\theta_1(m^{n-1})$ in Formula (64), Formula (65) is obtained.

[Expression 69]

$$R_{n-2} = \text{INT}\left(\text{mod}\left(\frac{\theta_{1(m^{n-1})} - \theta'_{1(m^{n-2})}}{m^{n-2} \times u} + 0.5, m\right)\right) \quad (64)$$

$$= \text{INT}\left(\text{mod}\left(\frac{S_{(m^{n-1})} \times m}{u} - \frac{\theta'_{1(m^{n-2})}}{m^{n-2} \times u} + 0.5, m\right)\right) \quad (65)$$

INT(x) here refers to an operation which drops a fractional part of a numerical value x. A modulo operation whose unit quantity is m is performed to obtain a calculation result when the coefficient $R_{n-2}$ falls within the effective range of 0 to m−1. As described above, a general formula for calculating the coefficients $R_0$ to $R_{n-2}$ is obtained as Formula (65).

The multi-turn absolute rotation angle calculated value $\theta_1(m^{n-1})'$ of the first rotating shaft is specifically obtained using Formula (65) for calculating the coefficients $R_0$ to $R_{n-2}$. For the sake of simplicity of description of calculation procedure, the rotation angle calculated value $\theta_1(m^3)'$ of the first rotating shaft is obtained on the assumptions that the number nmax of rotating shafts is 4, that the change ratio is 3/4 (m=4), and that the base unit quantity u is 1. First, at the time of calculation of the rotation angle calculated value $\theta_1(m^3)'$, theoretical angle detected values $p_1$, $p_2$, $p_3$, and $p_4$ of the respective rotating shafts when the rotation angle $\theta_1$ of the first rotating shaft is 53.5 (rev) are obtained.

The rotation angles $\theta_2$, $\theta_3$, and $\theta_4$ of the second, third, and fourth rotating shafts with respect to the rotation angle $\theta_1$ of the first rotating shaft are represented as in the formula below on the basis of Formula (1).

$$\theta_2 = -\frac{3}{4} \times \theta_1, \, \theta_3 = \frac{9}{16} \times \theta_1, \, \theta_4 = -\frac{27}{64} \times \theta_1 \quad \text{[Expression 70]}$$

If an angle detector with a shaft angle multiplier of 1 (the angle detector outputs a detected signal for one cycle when the corresponding rotating shaft revolves once) is used, the angle detected value $p_n$ of each rotating shaft is represented by $p_n = \text{mod}(\theta_n, 1)$. Accordingly, the theoretical angle detected values $p_1$, $p_2$, $p_3$, and $p_4$ of the respective rotating shafts exhibit numerical values obtained by the formulae below.

$$p_1 = \text{mod}(\theta_1, 1) = \text{mod}(53.5, 1) = 0.5 \quad \text{[Expression 71]}$$

$$p_2 = \text{mod}\left(-\frac{3}{4}\theta_1, 1\right)$$
$$= \text{mod}\left(-\frac{3}{4} \times 53.5, 1\right)$$
$$= \text{mod}(-40.125, 1)$$
$$= 0.875$$

$$p_3 = \text{mod}\left(\frac{9}{16}\theta_1, 1\right)$$
$$= \text{mod}\left(\frac{9}{16} \times 53.5, 1\right)$$
$$= \text{mod}(30.094, 1)$$
$$= 0.094$$

$$p_4 = \text{mod}\left(-\frac{27}{64}\theta_1, 1\right)$$
$$= \text{mod}\left(-\frac{27}{64} \times 53.5, 1\right)$$
$$= \text{mod}(-22.570, 1)$$
$$= 0.430$$

However, an output signal from an actual angle detector includes an error. The rotation angle calculated value $\theta_1(m^3)'$ is calculated on the assumption that the angle detected values below that are obtained by adding an error of, e.g., 0.05 (rev) to the theoretical angle detected values $p_1$, $p_2$, $p_3$, and $p_4$ are detected.

$p_1$=0.500+0.05=0.550
$p_2$=0.875+0.05=0.925
$p_3$=0.094+0.05=0.144
$p_4$=0.430+0.05=0.480

Assuming that the number nmax of rotating shafts is 4, that m is 4, and that the base unit quantity u is 1, as can be seen from Formula (27), the rotation angle calculated value $\theta_1(m^3)'$ is represented as in Formula (66) below.

[Expression 72]

$$\theta_{1(m^{n-1})}' = p_1 + R_0 \times m^0 + R_1 \times m^1 + R_2 \times m^2 = p_1 + R_0 + 4R_1 + 16R_2 \quad (66)$$

Accordingly, in order to obtain the rotation angle calculated value $\theta_1(m^3)'$, the coefficients $R_0$, $R_1$, and $R_2$ are sequentially calculated by using Formula (37), Formula (65), Formula (27), and Formula (36) for each of a case where n=2, a case where n=3, and a case where n=4.

Figure 12:
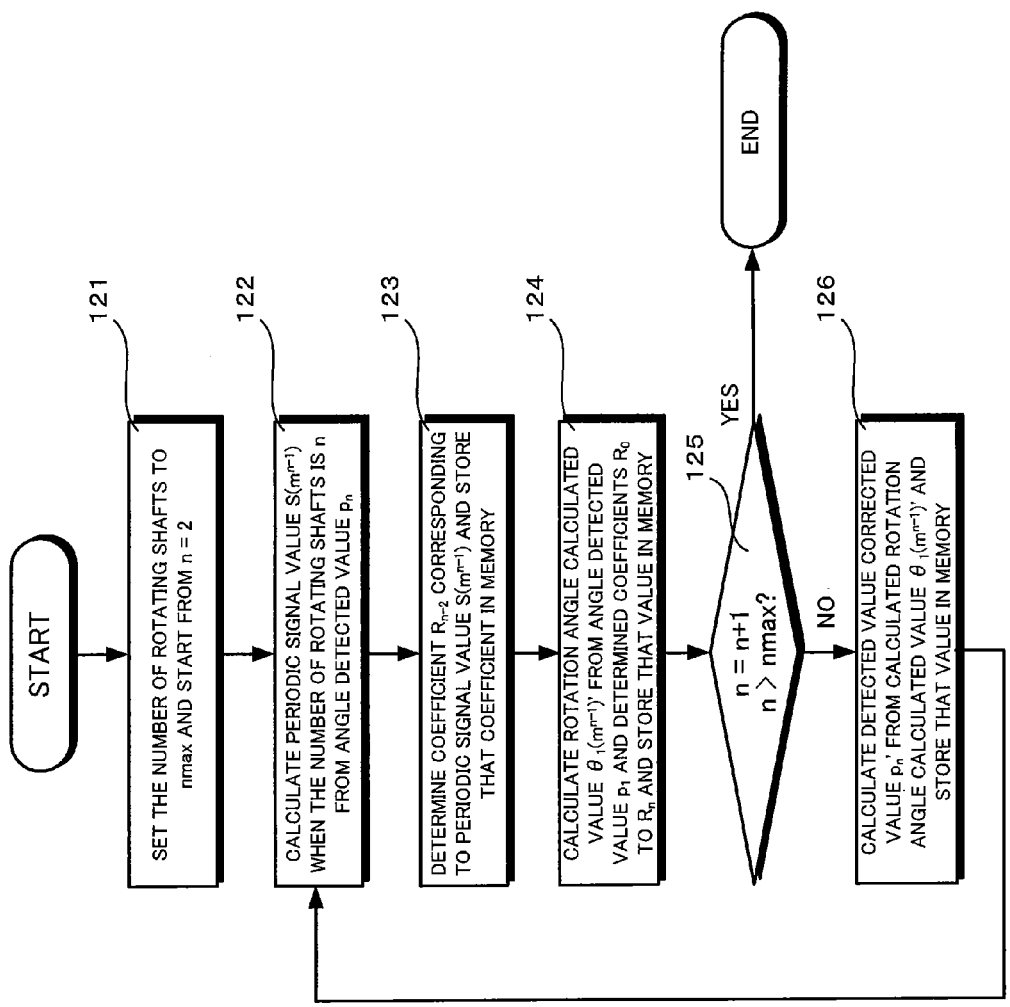
FIG. 12 is a flow chart showing the procedure for calculation processing of the rotation angle calculated value of the first rotating shaft in the second embodiment of the present invention.

The procedures for calculating the coefficients $R_0$, $R_1$, and $R_2$ are as shown below. As shown in the flow chart in FIG. 12, first, the number nmax of rotating shafts is set (to 4 in the example below), and a counter value n is set to 2 (step 121).

When the counter value n is 2, the periodic signal value $S(m^1)$ is calculated from the angle detected values $p_1$ and $p_2$ by Formula (39) (step 122). The coefficient $R_0$ corresponding to the periodic signal $S(m^1)$ is obtained by Formula (65) (step 123). Since the coefficient $R_0$ is used to calculate a next rotation angle calculated value, the coefficient $R_0$ is stored in a memory. When the coefficient $R_0$ is obtained, the rotation angle calculated value $\theta_1(m^1)'$ when the counter value n is 2 is calculated from the coefficient $R_0$ by Formula (50) and is stored in the memory (step 124). The counter value n is incremented by 1. If the counter value n is larger than nmax, the calculation that obtains a rotation angle calculated value ends. Otherwise, the flow advances to step 126 (step 125). Since, as for the calculated rotation angle calculated value $\theta_1(m^1)$, a term (the term $R_0 \times m^0$ here) other than the angle detected value $p_1$ in Formula (50) does not include a detection error, the angle corrected value $p_2'$ corresponding to the calculated rotation angle calculated value $\theta_1(m^1)'$ is obtained by Formula (36) and is stored in the memory (step 126). The angle corrected value $p_2'$ is used to calculate the next rotation angle calculated value $\theta_1(m^2)'$. The above-described steps are repeated for the number n of rotating shaft=3 and 4, and the coefficients $R_1$ and $R_2$ are sequentially obtained. Finally, the rotation angle calculated value $\theta_1(m^3)'$ is calculated (step 124), and the flow ends (step 125). The steps that calculate rotation angle calculated values when the number of rotating shafts is 4 have been schematically described above. Even if the number of rotating shafts is above 4, the same processes are repeated, the coefficients $R_0$ to $R_{n-2}$ are sequentially obtained, and the rotation angle calculated value $\theta_1(m^{n-1})'$ finally calculated. The above-described steps will be described in detail below.

First, the number nmax of rotating shafts is set to 4, and the counter value n is set to 2 (step 121). As for the periodic signal $S(m^1)$, 0.550 and 0.925 are substituted for $p_1$ and $p_2$, respectively, in Formula (67) below. The value of the periodic signal $S(m^1)$ is calculated in the manner below to be 0.475 (step 122).

[Expression 73]

$$\begin{aligned} S_{(m^1)} &= \mathrm{mod}(k_1 \times p_1 + k_2 \times p_2, 1) \\ &= \mathrm{mod}(p_1 + p_2, 1) \\ &= \mathrm{mod}(0.550 + 0.925, 1) \\ &= \mathrm{mod}(1.475, 1) \\ &= 0.478 \end{aligned} \qquad (67)$$

In Formula (67), $k_1$ and $k_2$ are 1.

As for the coefficient $R_0$, 0.475, 4, and 0.550 are substituted for $S(m^1)$, m, and $\theta_1(m^0)'=p_1$, respectively, in Formula (68) below. The coefficient $R_0$ is calculated in the manner below to be 1 (step 123).

[Expression 74]

$$\begin{aligned} R_0 &= \mathrm{INT}\left(\mathrm{mod}\left(S_{(m^1)} \times m - \frac{\theta'_{1(m^0)}}{m^0} + 0.5, m\right)\right) \\ &= \mathrm{INT}(\mathrm{mod}(S_{(m^1)} \times m - p_1 + 0.5, m)) \\ &= \mathrm{INT}(\mathrm{mod}(0.475 \times 4 - 0.55 + 0.5, 4)) \\ &= \mathrm{INT}(1.85) \\ &= 1 \end{aligned} \qquad (68)$$

The coefficient $R_0$ is stored in the memory for use at the time of calculation of a rotation angle calculated value to be finally obtained.

When $R_0$ is obtained, the rotation angle calculated value $\theta_1(m^1)'$ is obtained from Formula (50) as in Formula (69) below (step 124).

[Expression 75]

$$\theta_{1(m^1)}' = \theta_{1(m^0)}'(=p_1) + R_0 \times m^0 = 0.55 + 1 \times 1 = 1.55 \qquad (69)$$

The counter value n is incremented by 1. If the counter value n has not reached 4, the flow advances to a next step (step 125). In step 126, the angle corrected value $p_2'$ of the second rotating shaft corresponding to the rotation angle calculated value $\theta_1(m^1)'$ is obtained by Formula (36) (step 126).

[Expression 76]

$$p_2' = \mathrm{mod}\left(\left(-\frac{3}{4}\right)^1 \times \theta'_{1(m^1)}, 1\right) = \mathrm{mod}(-1.162, 1) = 0.838$$

The angle corrected value $p_2'$ is used to obtain the coefficient $R_1$ when the counter value n is 3.

The process flow returns from step 126 to step 122, and same processing as described above is repeated. That is, when the counter value n is 3, the periodic function $S(m^2)$ is obtained from Formula (37) in the manner below (step 122).

[Expression 77]

$$\begin{aligned} S_{(m^2)} &= \mathrm{mod}(k_1 \times p_1 + k_2 \times p_2' + k_3 \times p_3, 1) \\ &= \mathrm{mod}(p_1 + 2p_2' + p_3, 1) \\ &= \mathrm{mod}(0.550 + 2 \times 0.838 + 1 \times 0.144, 1) \\ &= \mathrm{mod}(2.370, 1) \\ &= 0.370 \end{aligned} \qquad (70)$$

In Formula (70), $k_1$ is 1, $k_2$=2, and $k_3$=1.

The coefficient $R_1$ is calculated by substituting 0.370, 4, and 1.55 for $S(m^2)$, m, and $\theta_1(m^1)'$, respectively, in Formula (65). The coefficient $R_1$ is calculated in the manner below to be 1 (step 123).

[Expression 78]

$$\begin{aligned} R_1 &= \mathrm{INT}\left(\mathrm{mod}\left(S_{(m^2)} \times m - \frac{\theta'_{1(m^1)}}{m^1} + 0.5, m\right)\right) \\ &= \mathrm{INT}\left(\mathrm{mod}\left(0.370 \times 4 - \frac{1.55}{4} + 0.5, 4\right)\right) \\ &= \mathrm{INT}(1.59) \\ &= 1 \end{aligned} \qquad (71)$$

When $R_1$ is obtained, the rotation angle calculated value $\theta_1(m^2)'$ is obtained from Formula (51) as in the formula below (step 124).

[Expression 79]

$$\begin{aligned} \theta'_{1(m^2)} &= \theta'_{1(m^1)} + R_1 \times m^1 \\ &= 1.55 + 1 \times 4 \\ &= 5.55 \end{aligned}$$

The angle corrected value $p_3'$ of the third rotating shaft corresponding to the rotation angle calculated value $\theta_1(m^2)'$ is obtained from Formula (36) in the manner below and is stored in the memory (step 126). The angle corrected value $p_3'$ is used to obtain the coefficient $R_2$ when the counter value n is 4.

[Expression 80]

$$p_3' = \mod\left(\left(-\frac{3}{4}\right)^2 \times \theta'_{1(m^2)}, 1\right)$$
$$= \mod\left(\frac{9}{16} \times 5.55, 1\right)$$
$$= \mod(3.122, 1)$$
$$= 0.122$$

When the number n of rotating shafts is 4, the periodic function $S(m^3)$ is obtained from Formula (37) in the manner below (step 122).

[Expression 81]

$$S_{(m^3)} = \mod(k_1 \times p_1 + k_2 \times p_2' + k_3 \times p_3' + k_4 \times p_4, 1) \quad (72)$$
$$= \mod(1 \times p_1 + 3 \times p_2' + 3 \times p_3' + 1 \times p_4, 1)$$
$$= \mod(1 \times 0.55 + 3 \times 0.838 + 3 \times 0.122 + 0.480, 1)$$
$$= \mod(3.91, 1)$$
$$= 0.91$$

In Formula (72), $k_1=1$, $k_2=3$, $k_3=3$, and $k_4=1$.

The coefficient $R_2$ is calculated by substituting 0.91, 4, and 5.55 for $S(m^3)$, m, and $\theta_1(m^2)'$, respectively, in Formula (65). The coefficient $R_2$ is calculated in the manner below to be 3 (step 123).

[Expression 82]

$$R_2 = \text{INT}\left(\mod\left(S_{(m^3)} \times m - \frac{\theta'_{1(m^2)}}{m^2} + 0.5, m\right)\right) \quad (73)$$
$$= \text{INT}\left(\mod\left(0.91 \times 4 - \frac{5.55}{16} + 0.5, 4\right)\right)$$
$$= \text{INT}(\mod(3.79, 4))$$
$$= 3$$

When $R_2$ is obtained, the rotation angle calculated value $\theta_1(m^3)'$ is obtained from Formula (52) in the manner below (step 124).

[Expression 83]

$$\theta'_{1(m^3)} = \theta'_{1(m^2)} + R_2 \times m^2$$
$$= 5.55 + 3 \ast 16$$
$$= 53.55$$

The counter value n is 4, and the process of obtaining a rotation angle calculated value ends (step 125). With the above-described calculations, the rotation angle calculated value $\theta_1(m^3)'$ of the first rotating shaft is calculated to be 53.55. As described in paragraph 0095 above, the calculations are based on the assumption that the rotation angle of the first rotating shaft is 53.5 (rev). An error in the rotation angle calculated value $\theta_1(m^3)'$ as the calculation result is only 0.05 that is added to the angle detected value of the first rotating shaft, and detection errors from the angle detectors of the second and subsequent rotating shafts are not accumulated.

Embodiment 3

Another calculation method for obtaining coefficients $R_0$ to $R_{n-2}$ in Formula (27) will be described. The method is the process of obtaining an angle detected value $p_n$ of each rotating shaft and a corrected angle corrected value $p_n'$ (Formula (36)) of each rotating shaft which is obtained from a multi-turn rotation angle calculated value $\theta_1(m^{n-1})'$ obtained by Formula (27) and determining the coefficients $R_0$ to $R_{n-2}$ such that the angle corrected value $p_n'$ most closely approximates the angle detected value $p_n$ on the assumption that the angle detected value $p_n$ and the angle corrected value $p_n'$ are substantially equal.

That the rotation angle calculated value $\theta_1(m^{n-1})'$ of a first rotating shaft can be mathematically expressed as the sum of an angle detected value $p_1$ of the first rotating shaft and the number of multi-turn revolutions of the first rotating shaft, as represented by Formula (27), has been described above. When Formula (27) is substituted for the rotation angle calculated value $\theta_1(m^{n-1})'$ in Formula (36), the angle corrected value $p_n'$ can be represented by Formula (74) below. The angle corrected value $p_n'$ approximates the angle detected value $p_n$.

[Expression 84]

$$p_n' = \mod\left(\left(-\frac{m \pm 1}{m}\right)^{n-1} \times (p_1 + (R_0 \times m^0 + R_1 \times m^1 + R_2 \times \right. \quad (74)$$
$$m^2 + \ldots + R_{n-2} \times m^{n-2}) \times u), u\right)$$
$$= \mod\left(\left(-\frac{m \pm 1}{m}\right)^{n-1} \times \left(p_1 + \sum_{i=2}^{n}(R_{i-2} \times m^{i-2}) \times u\right), u\right)$$
$$\approx p_n$$

Note that the part inside right-hand parentheses in a modulo calculation in Formula (74) above corresponds to the rotation angle calculated value $\theta_1(m^{n-1})$ in Formula (27).

In Formula (74) above, since the angle detected value $p_n$ is an angle within one revolution which is detected by an angle detector attached to each rotating shaft, and the coefficients $R_0$ to $R_{n-2}$ are integers ranging from 0 to m-1 inclusive, the angle corrected value $p_n'$ can be determined by appropriately selecting the coefficients $R_0$ to $R_{n-2}$ such that the angle corrected value $p_n'$ most closely approximates the angle detected value $p_n$. For example, an angle corrected value $p_2'$ of a second rotating shaft can be determined from an angle detected value $p_2$ in the manner below. That is, as seen from Formula (74), an angle corrected value calculation formula is represented as:

[Expression 85]

$$p_2' = \mod\left(\left(-\frac{m \pm 1}{m}\right)^1 \times (p_1 + (R_0 \times m^0 \times u), u\right)$$

The integral coefficient $R_0$ within the range $0 \leq R^0 < m$ may be appropriately selected such that a calculation result of the angle correction calculation formula most closely approximates the angle detected value $p_2$. By substituting the coefficient $R_0$ thus determined into Formula (74), the angle corrected value $p_2'$ is obtained. The above-described processing is repeated for n=2 to nmax to determine coefficients $R_0$ to $R_{nmax-2}$. A multi-turn rotation angle calculated value $\theta_1(m_{nmax-1})'$ of the first rotating shaft can be finally obtained by substituting the coefficients $R_0$ to $R_{nmax-2}$ into Formula (27).

An equation for calculating the coefficients $R_0$ to $R_{nmax-2}$ will be obtained below from Equation (74). When the deformation represented by Formula (53) is substituted into Equation (74), the angle corrected value $p_n'$ is represented by an angle corrected value calculation formula in Formula (75) below.

[Expression 86]

$$p_n' = \text{mod}\left(\left(-\frac{m \pm 1}{m}\right)^{n-1} \times \left(\theta'_{1(m^{n-2})} + R_{n-2} \times m^{n-2} \times u\right), u\right) \quad (75)$$

When Formula (75) is expanded, the angle corrected value $p_n'$ is represented as in Formula (76).

[Expression 87]

$$p_n' = \quad (76)$$
$$\text{mod}\left(\left(-\frac{m \pm 1}{m}\right)^{n-1} \times \theta'_{1(m^{n-2})} + \left(-\frac{m \pm 1}{m}\right)^{n-1} \times R_{n-2} \times m^{n-2} \times u, u\right)$$

When Formula (76) is further deformed, the angle corrected value $p_n'$ is represented as in Formula (77) below.

[Expression 88]

$$p_n' = \quad (77)$$
$$\text{mod}\left(\left(-\frac{m \pm 1}{m}\right)^{n-1} \times \theta'_{1(m^{n-2})} + \left(-1 \mp \frac{1}{m}\right)^{n-1} \times R_{n-2} \times m^{n-2} \times u, u\right)$$

Even if a numerical value which is an integer multiple of a divisor is added to or subtracted from a dividend in a modulo operation, a result of the modulo operation is not affected. The numerical value is thus removed from the modulo operation. That is, letting b be an integer, the relationship $y=\text{mod}(a+b\times c,c)=\text{mod}(a,c)$ holds. Since $R_{n-2}$ and $m^{m-2}$ are both natural numbers in Formula (77), the term $-1 \times R_{n-2} \times m^{m-2} \times u$ is deleted. As a result, Formula (77) is deformed as in Formula (78) below.

[Expression 89]

$$p_n' = \text{mod}\left(\left(-\frac{m \pm 1}{m}\right)^{n-1} \times \theta'_{1(m^{n-2})} \mp \frac{1}{m} \times R_{n-2} \times u, u\right) \quad (78)$$

Since the angle detected value $p_n$ is substantially equal to the angle corrected value $p_n'$, the angle detected value $p_n$ is represented as in Formula (79) below.

[Expression 90]

$$p_n \approx p_n' = \text{mod}\left(\left(-\frac{m \pm 1}{m}\right)^{n-1} \times \theta'_{1(m^{n-2})} \mp \frac{1}{m} \times R_{n-2} \times u, u\right) \quad (79)$$

Since the relationship between the angle detected value $p_n$ and the coefficient $R_{n-2}$ is derived as in Formula (79) above, the coefficient $R_{n-2}$ can be obtained in the manner below according to the definition of modulo operation. Generally, a modulo operation which obtains a remainder y left over when a±b is divided by c is represented by $y=\text{mod}(a\pm b,c)$, and the expression $a \pm b = n \times c + y$ holds. In the expression, n is an integer, and y falls within the range $0 \le y < c$. When a is moved to the right-hand side, the expression changes to $\pm b = n \times c + y - a$. A modulo operation which obtains a remainder left over when both sides of the expression are divided by c can be expressed as $\text{mod}(\pm b,c)=\text{mod}(n \times c+y-a,c)$. As described in paragraph 0119, the term n×c inside the parentheses can be deleted, the above expression can be organized into $\text{mod}(\pm b,c)=\text{mod}(y-a,c)$. If b falls within the range $0 \le b < c$, $b=\text{mod}(\pm(y-a),c)$ holds. A formula for obtaining the coefficient $R_{n-2}$ from Formula (79) using the relationship is derived in the manner below.

As described in paragraph 0072, the coefficient $R_{n-2}$ in Formula (79) falls within the range $0 \le R_{n-2} < m$, and $0 \le (1/m) \times R_{n-2} \times u < u$ holds. Accordingly, if $p_n'$, $(-(m\pm1)/m)^{n-1} \times \theta_1(m^{n-2})'$, $(1/m) \times R_{n-2} \times u$, and u in Formula (79) are taken as y, a, b, and c, respectively, $\text{mod}(\pm b,c)=\text{mod}(y-a,c)$ can be calculated as $b=\text{mod}(\pm(y-a),c)$ when b falls within the range $0 \le b < c$, as described above. That is, $(1/m) \times R_{n-2} \times u$ in the modulo operation of Formula (79) is obtained by Formula (80) below.

[Expression 91]

$$\frac{1}{m} \times R_{n-2} \times u \approx \text{mod}\left(\mp\left(p_n - \left(-\frac{m \pm 1}{m}\right)^{n-1} \times \theta'_{1(m^{n-2})}\right), u\right) \quad (80)$$

$$R_{n-2} \approx \text{mod}\left(\mp\left(p_n - \left(-\frac{m \pm 1}{m}\right)^{n-1} \times \theta'_{1(m^{n-2})}\right), u\right) \times \frac{m}{u}$$

Since $\text{mod}(a,c) \times b = \text{mod}(a \times b, c \times b)$ holds in modulo operation, the right-hand side of Formula (80) above can be further deformed as in Formula (81) below.

[Expression 92]

$$R_{n-2} \approx \text{mod}\left(\mp\left(p_n - \left(-\frac{m \pm 1}{m}\right)^{n-1} \times \theta'_{1(m^{n-2})}\right) \times \frac{m}{u}, m\right) \quad (81)$$

The coefficient $R_{n-2}$ is obtained by Formula (81). However, since the coefficient $R_{n-2}$ is an integer, a computation result of Formula (81) above is rounded off. The round-off to the nearest integer can be achieved by adding 0.5 to the computation result and performing a modulo operation to generate a carry, as shown in Formula (82) below. Note that INT(X) is an operator which drops a fractional part of X.

[Expression 93]

$$R_{n-2} = \quad (82)$$
$$\text{INT}\left(\text{mod}\left(\text{mod}\left(\mp\left(p_n - \left(-\frac{m \pm 1}{m}\right)^{n-1} \times \theta'_{1(m^{n-2})}\right) \times \frac{m}{u}, m\right) + 0.5, m\right)\right)$$

Since $\text{mod}(\text{mod}(a,c)+b,c)=\text{mod}(a+b,c)$ actually holds, Formula (82) is deformed as in Formula (83) below, and one modulo operation can be reduced.

[Expression 94]

$$R_{n-2} = INT\left(\mod\left(\mp\left(p_n - \left(-\frac{m\pm 1}{m}\right)^{n-1} \times \theta'_{1(m^{n-2})}\right) \times \frac{m}{u} + 0.5, m\right)\right) \quad (83)$$

Since a calculation formula for calculating the coefficient $R_{n-2}$ is obtained by Formula (83) above, $R_0$, $R_1$, and $R_2$ are obtained from Formula (83) by using the same detected values (paragraph 0098) of the respective rotating shafts as those in Embodiment 2, $R_0$, $R_1$, and $R_2$ are substituted into Formula (27), and a rotation angle calculated value $\theta_1(m^3)'$ of the first rotating shaft is calculated. Assume in the calculation example below that a base unit quantity u is 1000 and that detected values $p_1$, $p_2$, $p_3$, and $p_4$ of the respective rotating shafts are 550, 925, 144, and 480, respectively.

Figure 13:
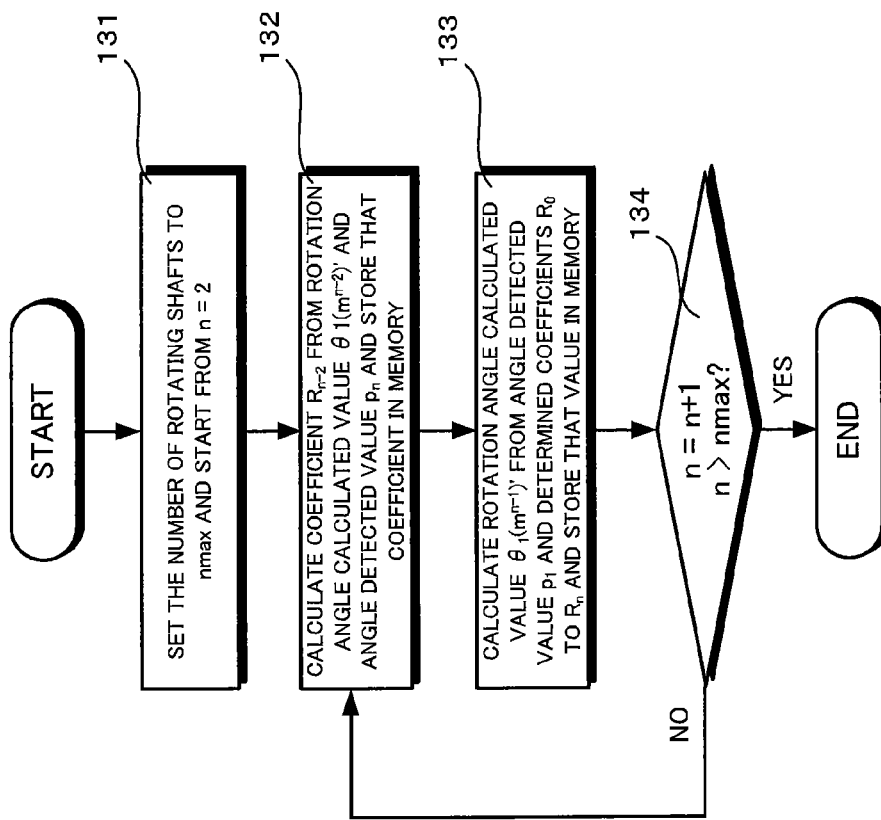
FIG. 13 is a flow chart showing the procedure for calculation processing of a rotation angle calculated value of a first rotating shaft in a third embodiment of the present invention.

The procedures for calculating the coefficient $R_0$, $R_1$, and $R_2$ are as described below. As shown in the flow chart in FIG. 13, first, the number nmax of rotating shafts is set (to 4 in the example below), and a counter value n is set to 2 (step 131). When the counter value n is 2, a rotation angle calculated value $\theta_1(m^0)'(=p_1)$ and the angle detected value $p_2$ are substituted into Formula (83), and the coefficient $R_0$ is calculated. The coefficient $R_0$ is stored in a memory for use at the time of calculation of a next rotation angle calculated value (step 132). When the coefficient $R_0$ is obtained, the angle detected value $p_1$ and the coefficient $R_0$ are substituted into Formula (27), and a rotation angle calculated value $\theta_1(m^1)'$ is calculated and stored in the memory (step 133). The counter value n is incremented by 1, and the flow returns to step 132 (step 134). The above-described calculation processing is repeated for the counter value n=3 and 4, and the coefficients $R_1$ and $R_2$ are obtained. Finally, the rotation angle calculated value $\theta_1(m^3)'$ is calculated (step 133). If the counter value n is above nmax, the calculation that obtains a rotation angle calculated value ends (step 134). The steps when the number of rotating shafts is 4 have been schematically described above. Even if the number of rotating shafts is above 4, the same processes are repeated, the coefficients $R_0$ to $R_{n-2}$ are sequentially obtained, and the rotation angle calculated value $\theta_1(m^{n-1})'$ is finally calculated. The above-described steps will be described in detail below.

First, the number nmax of rotating shafts is set to 4, and the counter value n is set to 2 (step 131). When n=2 is substituted into Formula (83), the coefficient $R_0$ is obtained by Formula (84) below (step 132).

[Expression 95]

$$R_{2-2} = INT\left(\mod\left(\mp\left(p_2 - \left(-\frac{m\pm 1}{m}\right)^{2-1} \times \theta'_{1(m^{2-2})}\right) \times \frac{m}{u} + 0.5, m\right)\right) \quad (84)$$

When 925, 550 (=$p_1$), 4, and 1000 are substituted for $p_2$, $\theta_1(m^0)'$, m, and u, respectively, in Formula (84) on the assumption that a driven gear is slower than a driving gear between rotating shafts, Formula (85) below is obtained.

[Expression 96]

$$R_0 = INT\left(\mod\left(+\left(925 - \left(-\frac{3}{4}\right)^1 \times 550\right) \times \frac{4}{1000} + 0.5, 4\right)\right) \quad (85)$$

The calculated coefficient $R_0$ is stored in the memory for subsequent processing.

From Formula (50), the rotation angle calculated value $\theta_1(m^1)'$ is represented as:

[Expression 97]

$$\theta'_{1(m^1)} = p_1 + (R_0 \times m^0) \times u \quad (86)$$

When 550, 1, 4, and 1000 are substituted for $p_1$, $R_0$, m, and u, respectively in Formula (86), the rotation angle calculated value $\theta_1(m^1)'$ is calculated as in the formula below and is stored in the memory (step 133).

[Expression 98]

$$\theta'_{1(m^1)} = 550 + (1 \times 1) \times 1000$$
$$= 1550$$

The counter value n is incremented by 1 (n=3), and the flow returns to step 132 (step 134). When n=3 is substituted into Formula (83), the coefficient $R_1$ is obtained by Formula (87) below.

[Expression 99]

$$R_{3-2} = INT\left(\mod\left(\mp\left(p_3 - \left(-\frac{m\pm 1}{m}\right)^{3-1} \times \theta_{1(m^{3-2})}'\right) \times \frac{m}{u} + 0.5, m\right)\right) \quad (87)$$

When 144, 1550, 4, and 1000 are further substituted for $p_3$, $\theta_1(m^1)'$, m, and u, respectively, in the above formula, the coefficient $R_1$ is obtained by Formula (88) below (step 132).

[Expression 100]

$$R_1 = INT\left(\mod\left(+\left(144 - \left(-\frac{3}{4}\right)^2 \times 1550\right) \times \frac{4}{1000} + 0.5, 4\right)\right) \quad (88)$$
$$= INT\left(\mod\left(\frac{(144 - 872) \times 4}{1000} + 0.5, 4\right)\right)$$
$$= INT(\mod(-2.91 + 0.5, 4))$$
$$= INT(\mod(-2.41, 4))$$
$$= INT(1.59)$$
$$= 1$$

The coefficient $R_1$ is 1, and the value is stored in the memory for subsequent processing (step 132).

From Formula (51), the rotation angle calculated value $\theta_1(m^2)'$ is represented as:

[Expression 101]

$$\theta'_{1(m^2)} = \theta'_{1(m^1)} + R_1 \times m^1 \times u \quad (89)$$

When 1550, 1, 4, and 1000 are substituted for $\theta_1(m^1)'$, $R_1$, m, and u, respectively, in Formula (89), a rotation angle calculated value $\theta_1(m^2)'$ is calculated as in the formula below (step 133).

[Expression 102]

$$\theta'_{1(m^2)} = 1550 + 1 \times 4^1 \times 1000$$
$$= 1550$$

The counter value n is incremented by 1 (n=4), and the process returns to step 132 (step 134). When n=4 is substituted into Formula (83), the coefficient $R_2$ is obtained by Formula (90) below.

[Expression 103]

$$R_{4-2} = INT\left(\text{mod}\left(\mp\left(p_4 - \left(-\frac{m\pm 1}{m}\right)^{4-1} \times \theta_{1(m^{4-2})'}\right) \times \frac{m}{u} + 0.5, m\right)\right) \quad (90)$$

When 480, 5550, 4, and 1000 are further substituted for $p_4$, $\theta_1(m^2)'$, m, and u, respectively, in the formula above, the coefficient $R_2$ is obtained by Formula (91) below (step 132).

[Expression 104]

$$\begin{aligned}R_2 &= INT\left(\text{mod}\left(+\left(480 - \left(-\frac{3}{4}\right)^3 \times 5550\right) \times \frac{4}{1000} + 0.5, 4\right)\right) \quad (91)\\ &= INT\left(\text{mod}\left(\frac{(480 + 2341) \times 4}{1000} + 0.5, 4\right)\right)\\ &= INT(\text{mod}(11.28 + 0.5, 4))\\ &= INT(\text{mod}(11.78, 4))\\ &= INT(3.78)\\ &= 3\end{aligned}$$

The coefficient $R_2$ is 3, and the value is stored in the memory for subsequent processing (step 132).

From Formula (52), $\theta_1(m^3)'$ is represented as:

[Expression 105]

$$\theta_{1(m^3)'} = \theta_{1(m^2)'} + R_2 \times m^2 \times u \quad (92)$$

When 5550, 3, 4, and 1000 are substituted for $\theta_1(m^2)'$, $R_2$, m, and u, respectively, in Formula (92), the rotation angle calculated value $\theta_1(m^3)'$ is calculated as in the formula below (step 133).

$$\begin{aligned}\theta_{1(m^3)'} &= 5550 + 3 \times 4^2 \times 1000 \quad \text{[Expression 106]}\\ &= 53550\end{aligned}$$

As a result, the rotation angle calculated value $\theta_1(m^3)'$ of the first rotating shaft that is calculated by the method according to Embodiment 3 is 53550 (the base unit quantity u=1000). The rotation angle calculated value is equivalent to the rotation angle calculated value $\theta_1(m^3)'=53.55$ (the base unit quantity u=1) of the first rotating shaft that is obtained in Embodiment 2.

Embodiment 4

Figure 14:
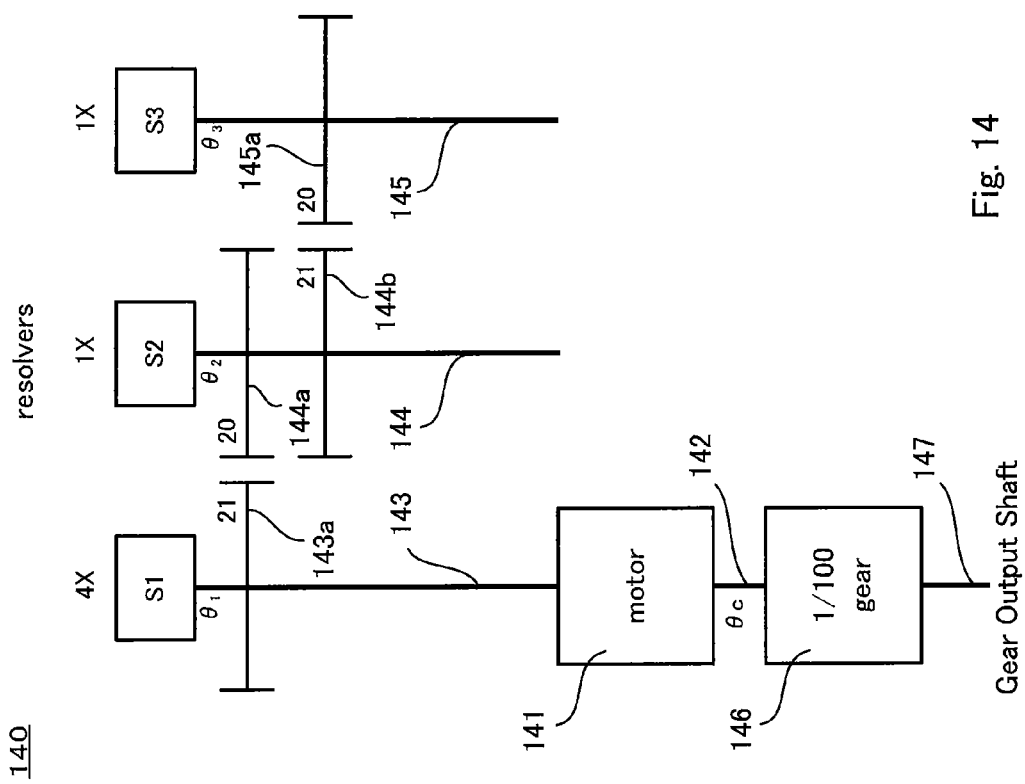
FIG. 14 is a configuration block diagram of a transmission mechanism of a rotation angle detection device for explaining the principle of obtaining a multi-turn absolute rotation angle according to a fourth embodiment of the present invention.

A fourth embodiment according to the present invention will be described. FIG. 14 shows a block diagram of an angle detection device 140 which detects a multi-turn absolute rotation angle of an output rotating shaft 142 of a motor 141. The principle of obtaining the multi-turn absolute rotation angle of the output rotating shaft 142 is basically the same as that in the first embodiment. Before the principle is described, the configuration of the angle detection device 140 will be described.

Referring to FIG. 14, a gear 143*a* having 21 teeth is fixed to a first rotating shaft 143 which is coupled to the motor 141 on the opposite side from the output rotating shaft 142, and a 4× resolver S1 is attached to the first rotating shaft 143 to detect a rotation angle $\theta_1$ of the first rotating shaft 143. The 4× resolver S1 outputs sinusoidal voltage corresponding to the rotation angle of the first rotating shaft 143 and outputs sinusoidal voltage whose four cycles correspond to one revolution of the first rotating shaft 143.

The gear 143*a* is meshed with a gear 144*a* having 20 teeth which is fixed to a second rotating shaft 144. A 1× resolver S2 is attached to the second rotating shaft 144 to detect a rotation angle $\theta_2$ of the second rotating shaft 144. A gear 144*b* having 21 teeth is further fixed to the second rotating shaft 144 and is meshed with a gear 145*a* having 20 teeth which is fixed to a third rotating shaft 145. A 1× resolver S3 is attached to the third rotating shaft 145 to detect a rotation angle $\theta_3$ of the third rotating shaft 145. The gears 144*a* and 144*b* that are fixed to the second rotating shaft 144 are integrally formed resin gears and may be formed integrally with the rotating shaft.

By way of example, the angle detection device 140 with the above-described configuration transmits revolution of the motor by the gears fixed to the three rotating shafts and calculates an absolute rotation angle of the motor rotating shaft from the rotation angles of the respective rotating shafts. By selecting the respective numbers of teeth of the gears such that the change ratio between gears meshed together is (m±1)/m, the absolute rotation angle of the motor rotating shaft is calculated by the computation formula below.

If the change ratio between adjacent rotating shafts is set to (m+1)/m, a rotation angle $\theta_n$ of each rotating shaft is obtained by:

$$\theta_n = \left(-\frac{m+1}{m}\right)^{n-1} \times \theta_1 = \left(-1 - \frac{1}{m}\right)^{n-1} \times \theta_1 \quad \text{[Expression 107]}$$

Since the angle detectors S1 to S3 detect the rotation angles of the first to third rotating shafts 143 to 145, detected values $p_1$ to $p_3$ from the angle detectors S1 to S3 can be expressed by Formulae (93) to (95), as shown in Formula (6) used in the first embodiment. Note that since the angle detector S1 is a 4× detector which outputs a detected value for 4 cycles while the rotating shaft revolves once, a detected quantity $u_1$ per one cycle of the first rotating shaft 143 is set to 0.25. Since the angle detectors S2 and S3 are 1× detectors, detected quantities $u_2$ and $u_3$ per one cycle are set to 1.

[Expression 108]

$$p_1 = \text{mod}(1 \times \theta_1, u_1) = \text{mod}(1 \times \theta_1, 0.25) \quad (93)$$

[Expression 109]

$$p_2 = \text{mod}\left(\left(-1 - \frac{1}{m}\right) \times \theta_1, u_2\right) = \text{mod}\left(\left(-1 - \frac{1}{m}\right) \times \theta_1, 1\right) \quad (94)$$

[Expression 110]

$$\begin{aligned}p_3 &= \text{mod}\left(\left(1 + \frac{2}{m} + \frac{1}{m^2}\right) \times \theta_1, u_3\right) \quad (95)\\ &= \text{mod}\left(\left(1 + \frac{2}{m} + \frac{1}{m^2}\right) \times \theta_1, 1\right)\end{aligned}$$

In order to calculate an absolute rotation angle of the first rotating shaft 143, the detected quantities upper cycle of the respective rotating shafts need to be equalized. The detected values of the second and third rotating shafts 144 and 145 are converted to 4×, as in Formulae (96) and (97).

[Expression 111]

$$p'_2 = \text{mod}\left(\left(-1 - \frac{1}{m}\right) \times \theta_1, 0.25\right) \quad (96)$$

[Expression 112]

$$p'_3 = \text{mod}\left(\left(1 + \frac{2}{m} + \frac{1}{m^2}\right) \times \theta_1, 0.25\right) \quad (97)$$

In light of u set to 0.25, assume a periodic signal whose one cycle corresponds to m/4 revolutions of the first rotating shaft. A modulo formula representing the periodic signal can be expressed as:

$$\text{mod}\left(\frac{1}{m} \times \theta_1, 0.25\right) \quad \text{[Expression 113]}$$

The modulo formula can be deformed using the detected values $p_1$ and $p_2'$ of the first and second rotating shafts 143 and 144, as in Formula (98).

[Expression 114]

$$\text{mod}\left(\frac{1}{m} \times \theta_1, 0.25\right) = \text{mod}(-(p_1 + p'_2), 0.25) \quad (98)$$

Assuming a periodic signal whose one cycle corresponds to $m^2/4$ revolutions of the first rotating shaft, a modulo formula representing the periodic signal can be expressed as:

$$\text{mod}\left(\frac{1}{m^2} \times \theta_1, 0.25\right) \quad \text{[Expression 115]}$$

The modulo formula can be deformed using the detected values $p_1$, $p_2'$, and $p_3'$ of the first to third rotating shafts 143 to 145, as in Formula (99).

[Expression 116]

$$\text{mod}\left(\frac{1}{m^2} \times \theta_1, 0.25\right) = \text{mod}(p_1 + 2p'_2 + p'_3, 0.25) \quad (99)$$

When m=20 is substituted into Formula (99), Formula (99) can be represented as in Formula (100).

[Expression 117]

$$\text{mod}\left(\frac{1}{400} \times \theta_1, 0.25\right) = \text{mod}(p_1 + 2p'_2 + p'_3, 0.25) \quad (100)$$

If the both sides of Formula (100) are multiplied by 400, Formula (101) is obtained.

[Expression 118]

$$\theta c = \text{mod}(\theta_1, 100) = \text{mod}(p_1 + 2p_2' + p_3', 0.25) \times 400 \quad (101)$$

As seen from Formula (101), when the first rotating shaft 143 revolves 100 times, a signal for one cycle is obtained. An absolute rotation angle for 100 revolutions can be detected. As shown in FIG. 14, a gear 146 which reduces the number of revolutions of the output rotating shaft 142 of the motor 141 to one-hundredth. As a result, a reduction gear ratio and a multi-turn detection range are consistent with each other. This allows the angle detection device 140 to detect an absolute rotation angle for one revolution of a gear output shaft 147.

Since the relationship shown in Formula (10) is obtained, as described above, the embodiment shown in FIG. 14 can detect an absolute rotation angle for 100 revolutions. Generally, if an NX angle detector is used, a multi-turn detection range whose upper end is represented by $m^{n-1}/N$ is obtained.

An NX detected value can be obtained by calculation from a 1× detected value. Even without actual use of an NX angle detector, it is possible to reduce a multi-turn detection range to 1/N to suit a multi-turn detection range required for an application using a rotation angle detection device.

Depending on the change ratio of (m±1)/m, calculation of:

[Expression 119]

$$\text{mod}\left(\left(\frac{1}{m}\right)^{n-1} \times \theta_1, u\right) = \text{mod}((k_1 \times p_1 + k_2 \times p_2 + \ldots + k_n \times p_n), u) \quad (102)$$

can also be performed without consideration of coefficients $k_1$ to $k_n$ in the expansion of the binomial $(x+1)^{n-1}$.

For example, assume that m=3, i.e., $m^{-1}=2$ holds. If a rotation angle is detected up to $m^3=27$ revolutions using a detected signal of a fourth rotating shaft, calculation can be performed not only by $\theta_c = \text{mod}(p_1+3p_2+3p_3+p_4,1) \times m^3$ but also by $\theta_c = \text{mod}(p_1+p_2+p_4,1) \times m^3$.

Note that detected values $p_n$ of the respective rotating shafts include not only a value obtained by directly processing a signal from a detector but also a value obtained by converting a signal to a signal with a different period. Although the above-described embodiment performs the process of converting each of the detected values of the second and third rotating shafts from a long-period signal (1× signal) to a short-period signal (4× signal), the process of generating a 1× signal of a first shaft from a combination of an nx detector of the first shaft and a 1× detector with a different change ratio of a second shaft may be applied to the present invention, as described in Japanese Patent No. 3967963 described above. In the above description, a rotation angle of an odd-numbered rotating shaft is treated as positive, an even-numbered rotating shaft is treated as negative, and the rotation angles are added up. However, even if rotation angles are treated as positive, and each rotation angle is added or subtracted according to a rotation direction, the same result is obtained.

Figure 15:
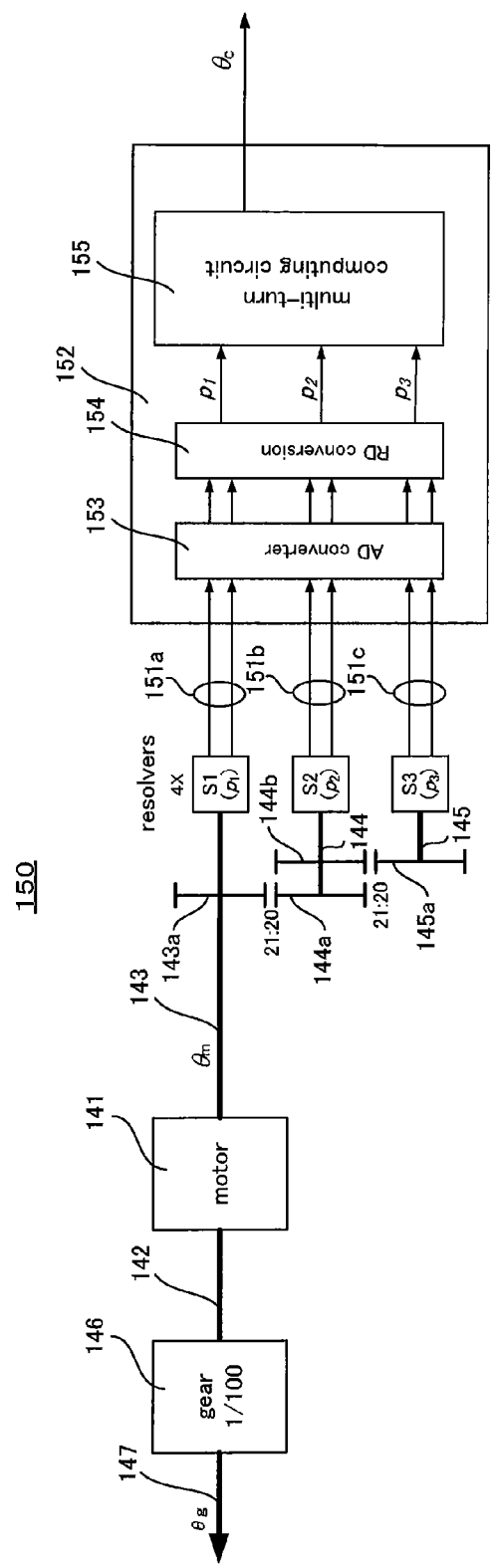
FIG. 15 is a block diagram of the rotation angle detection device for calculating a multi-turn absolute rotation angle of a motor rotating shaft in the fourth embodiment of the present invention.

FIG. 15 is a block diagram of a rotation angle detection device 150 for calculating a multi-turn absolute rotation angle θc of the motor 141 on the basis of the fourth embodiment shown in FIG. 14. In FIG. 15, elements same as or similar to the elements shown in FIG. 14 are denoted by same reference numerals.

The fourth embodiment shown in FIG. 15 is basically the same as the first embodiment shown in FIG. 3 except that the number of rotating shafts is 3, that a resolver is used as an angle detector, and that the 1/100 gear is coupled to the output shaft of the motor 141.

Referring to FIG. 15, the gear 143a having 21 teeth is fixed to the first rotating shaft 143 that is coupled to the motor 141 on the opposite side from the output rotating shaft 142, and the 4× resolver S1 is attached to the first rotating shaft 143. The gear 143*a* is meshed with the gear 144*a* having 20 teeth that is fixed to the second rotating shaft 144. The change ratio between the gear 143*a* and the gear 144*a* is 21/20. The gear 144*b* having 21 teeth is also fixed to the second rotating shaft 144 and is meshed with the gear 144*a* having 20 teeth that is fixed to the third rotating shaft 145. The 1× resolvers S2 and S3 are attached to the second and third rotating shafts, respectively.

Figure 16:
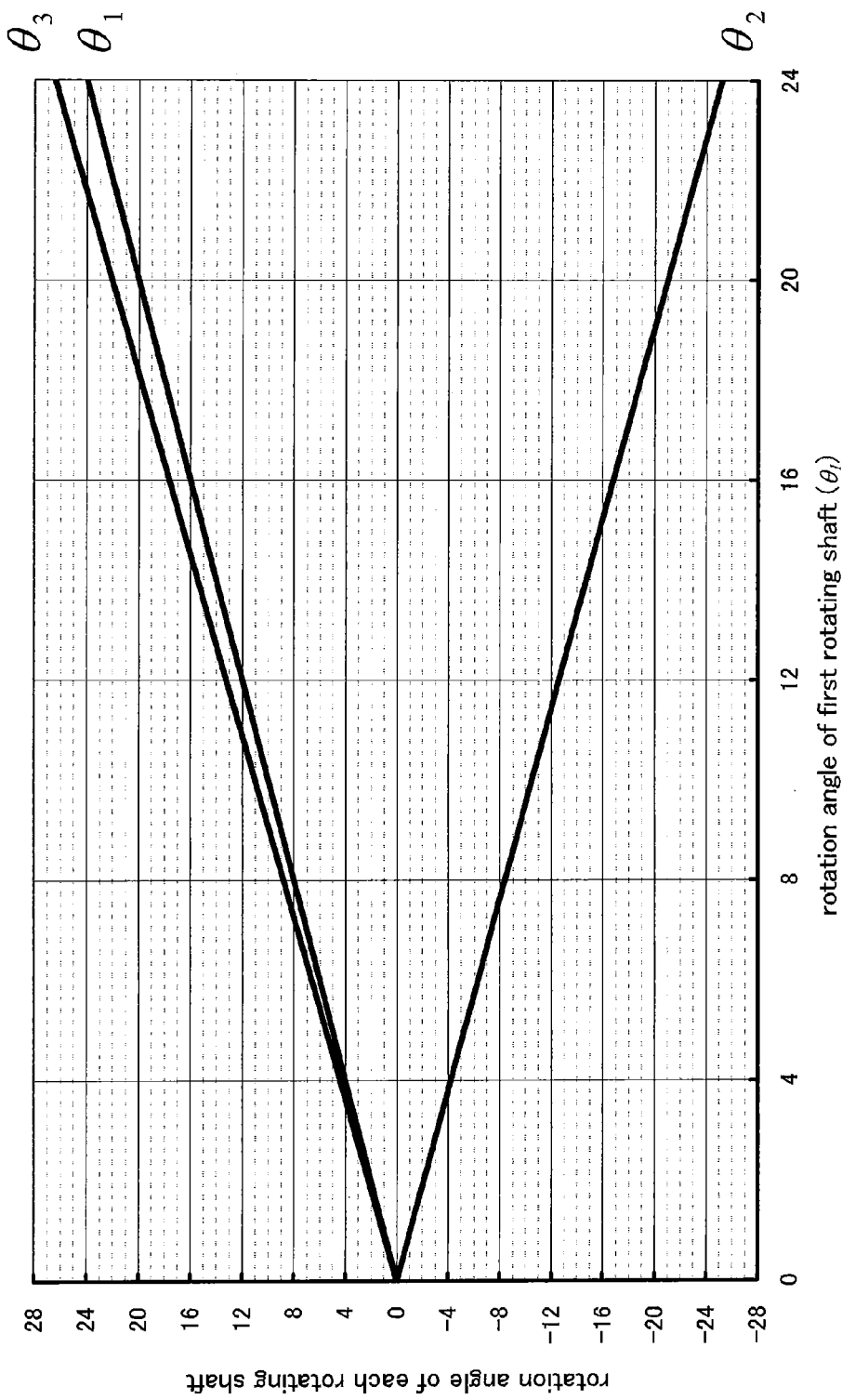
FIG. 16 is a graph showing the relationships between the number of revolutions of a first rotating shaft and first to third rotation angles in the fourth embodiment of the present invention.

FIG. 16 shows the relationships between the rotation angle of the first rotating shaft and the rotation angles of the other rotating shafts. As shown in FIG. 16, since the change ratios between the gear 143*a* and the gear 144*a* and between the gear 144*b* and the gear 145*a* are 21/20, the rotation angles of the second and third rotating shafts are larger than that of the first rotating shaft.

Referring back to FIG. 15, two sinusoidal detected voltages (a sin component and a cosin component) from each of the resolvers S1 to S3 are sent to an AD converter 153 of a signal processing circuit 152 via a signal line 151*a*, 151*b*, or 151*c*. The AD converter 153 converts the detected voltages to digital values, which are sent to an RD conversion computing circuit 154. The RD conversion computing circuit 154 calculates an angle from the two received digital values (the sin component and cosin component) and subjects the detected voltages to various types of accuracy correction, like the RD conversion computing circuit 38 according to the first embodiment. The angle detected values $p_1$, $p_2$, and $p_3$ subjected to the processes are sent to a multi-turn computing circuit 155, and the multi-turn absolute rotation angle $\theta c$ is calculated by Formula (101).

Figure 17:
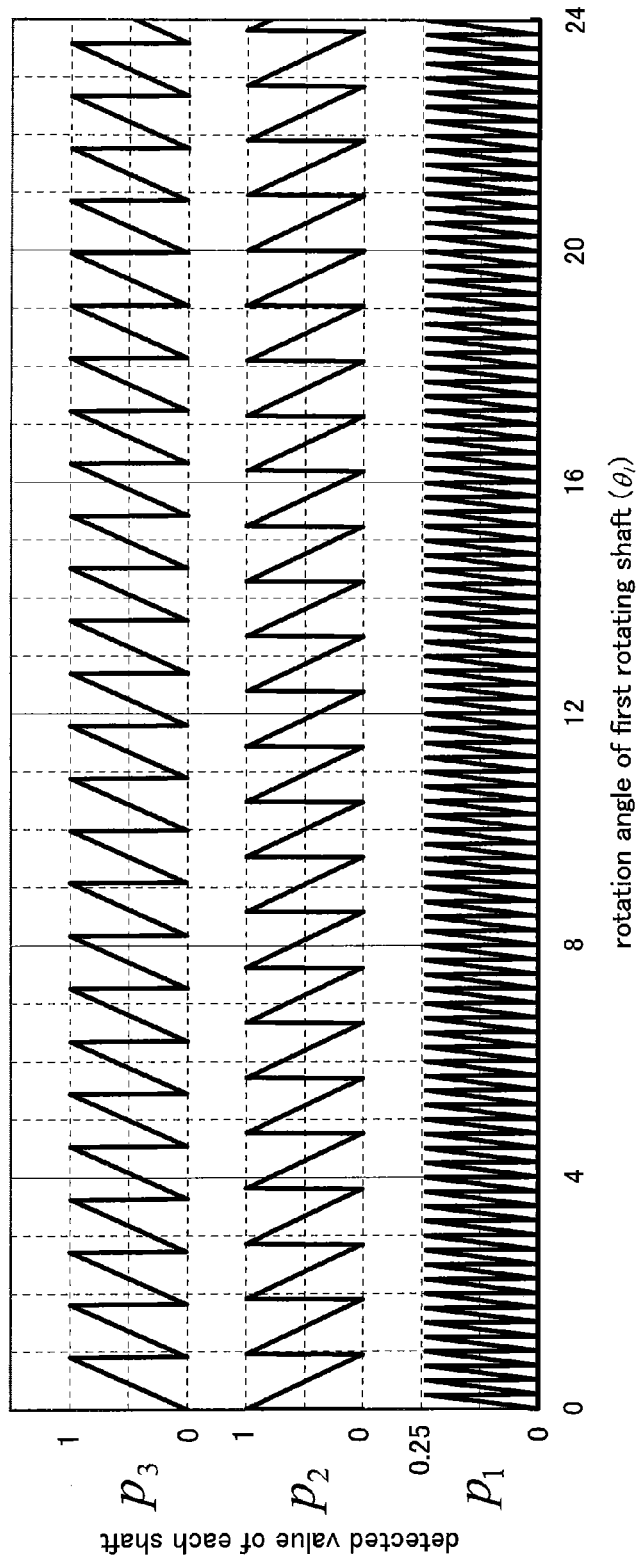
FIG. 17 is a graph showing the relationships between the number of revolutions of the first rotating shaft and detected values $p_1$, $p_2$, and $p_3$ of respective shafts in the fourth embodiment of the present invention.

FIG. 17 shows the angle detected values p1, p2, and p3 of the first to third rotating shafts that are obtained with respect to the number of revolutions of the first rotating shaft by the RD conversion computing circuit 154. The bottom line in FIG. 17 shows the rotation angle detected value of the first rotating shaft from the 4× resolver. A 4× resolver outputs detected voltages for 4 cycles when a rotating shaft revolves once. Accordingly, when the first rotating shaft revolves once, detected voltages for four sawtooth waves are output. The middle line and the top line in FIG. 17 show detected voltages from the resolvers S2 and S3, respectively, which represent the rotation angles of the second and third rotating shafts. Since the resolvers S2 and S3 are 1× resolvers, each resolver outputs detected voltages for one cycle when the rotating shaft revolves once.

Figure 18:
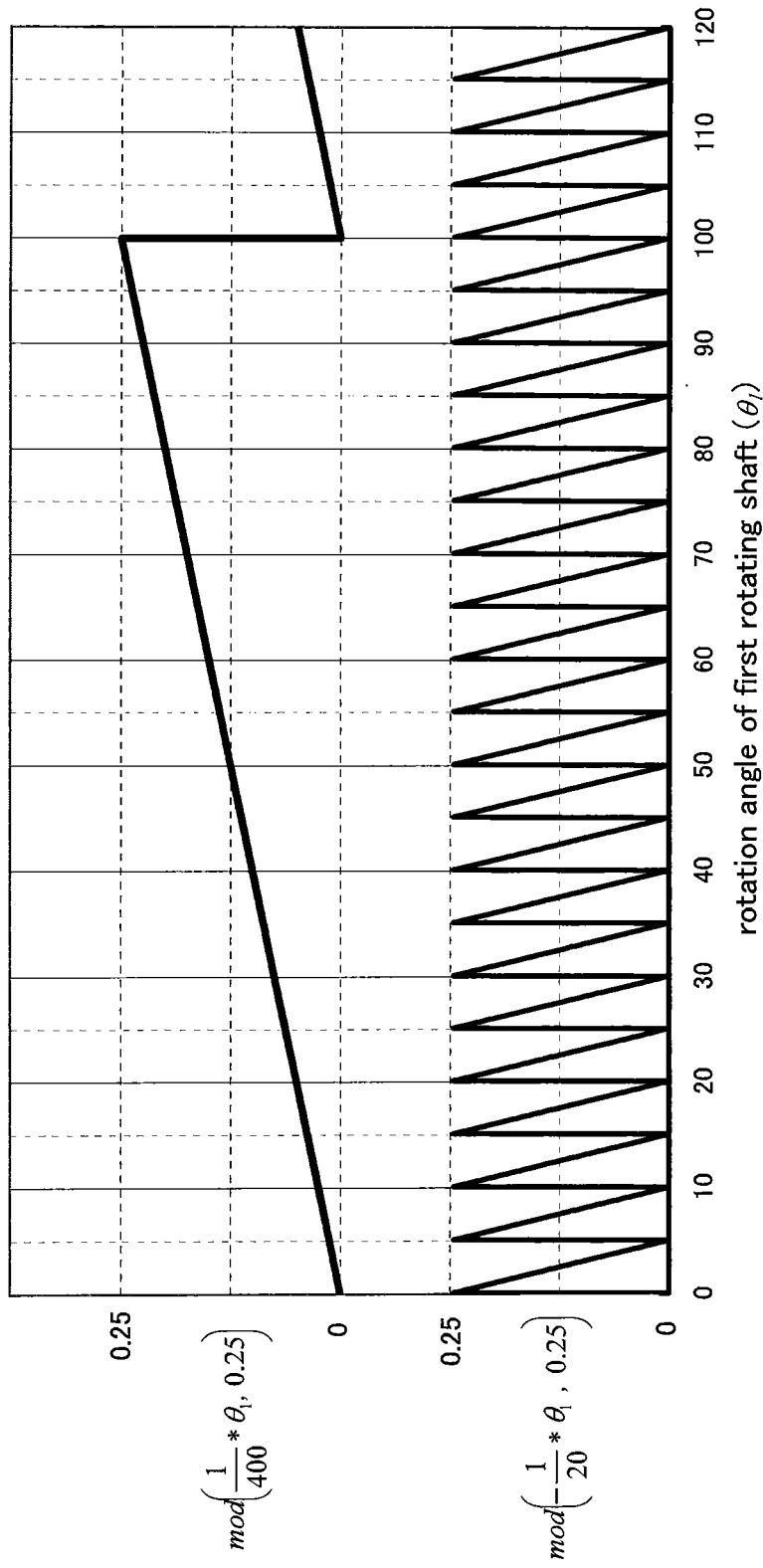
FIG. 18 is a graph showing the relationships of periodic signals with the number of revolutions of the first rotating shaft in the fourth embodiment of the present invention.

FIG. 18 shows periodic signals with respect to the number of revolutions of the first rotating shaft which are obtained by Formulae (98) and (99). Signal waves at the bottom in FIG. 18 represent a periodic signal whose one cycle corresponds to 5 revolutions of the first rotating shaft and which is obtained by Formula (98). That is, the periodic signal is calculated on the basis of the angle detected values $p_1$ and $p_2$ that are detected by the resolvers S1 and S2. Signal waves at the top in FIG. 18 represent a periodic signal whose one cycle corresponds to 100 revolutions of the first rotating shaft and which is obtained by Formula (99). That is, the periodic signal is calculated on the basis of the angle detected values $p_1$, $p_2$, and $p_3$ that are detected by the resolvers S1, S2, and S3. As described above, the multi-turn absolute rotation angle $\theta c$ of the first rotating shaft can be obtained from the angle detected values $p_1$, $p_2$, and $p_3$ that are detected by the resolvers S1, S2, and S3, respectively, by Formula (101).

In Embodiment 1 above, an optical encoder is used as the angle detector of the first rotating shaft, and MR rotation angle sensors using MR elements are used as the angle detectors of the second rotating shaft to the fourth rotating shaft. In Embodiment 4, the resolvers are used. However, embodiment of the present invention does not limit the types of the angle detectors. Gears are used as the transmission mechanism. Means for changing rotation angles, however, is not limited to gears, and examples of the means include a transmission such as a belt, a chain, or a traction drive. Since (m±1)/m described above represents a change ratio, and the embodiments have been described using gears as the transmission mechanism, m and m±1 correspond to the numbers of teeth of gears. The terms, however, are not limited to the numbers of teeth of gears.

Embodiment 5

Figure 19:
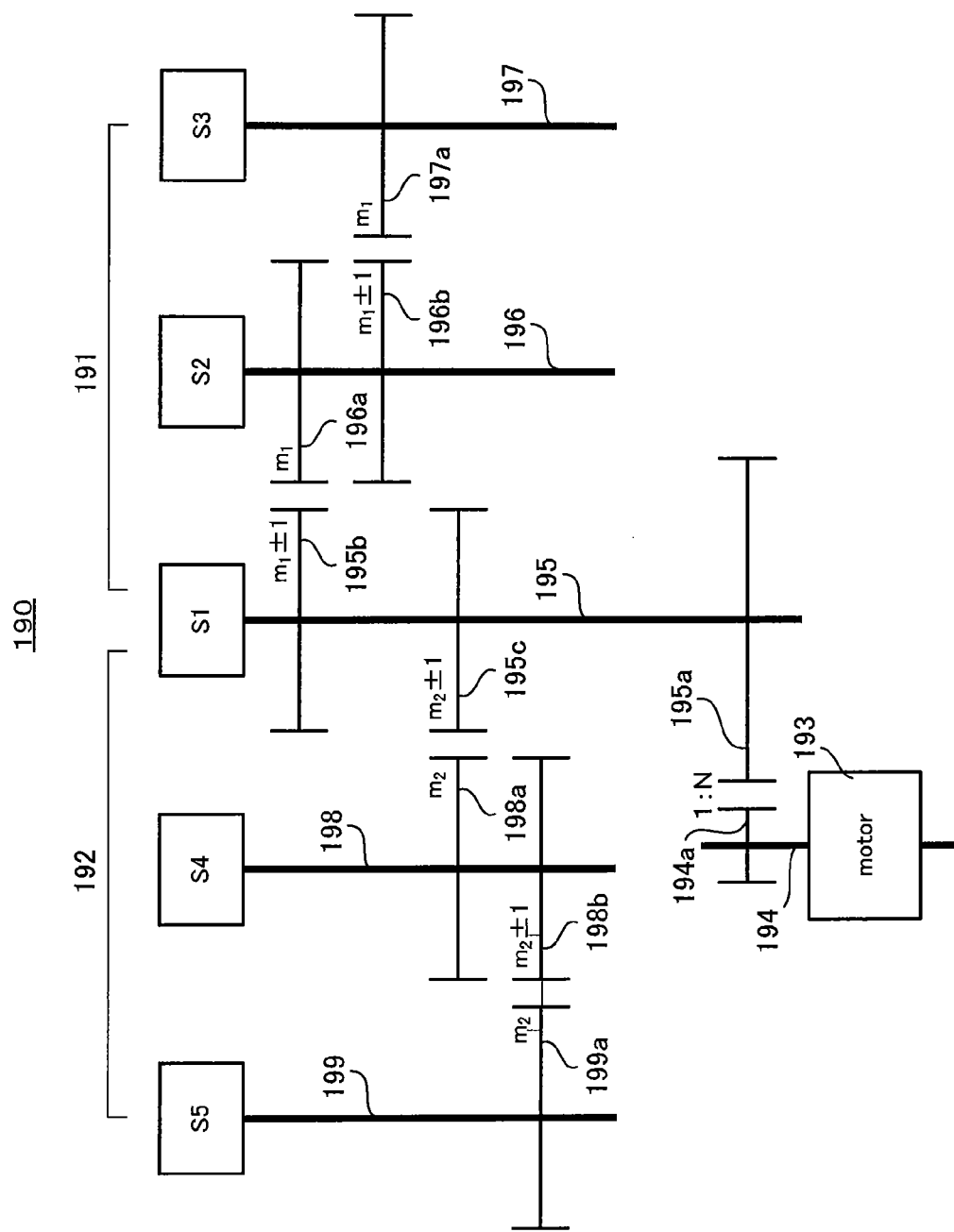
FIG. 19 is a configuration block diagram of a transmission mechanism of a rotation angle detection device according to a fifth embodiment of the present invention.

FIG. 19 is a configuration block diagram of a transmission mechanism 190 of a rotation angle detection device according to a fifth embodiment of the present invention. The transmission mechanism 190 is a transmission mechanism which is obtained by providing the transmission mechanisms 10 shown in FIG. 1 in parallel and is made up of a gear mechanism 191 in a first system and a gear mechanism 192 in a second system. A gear 194*a* which is attached to a motor rotating shaft 194 of a motor 193 is meshed with a gear 195*a* which is attached to a first rotating shaft 195, and the gear ratio between the motor rotating shaft 194 and the first rotating shaft 195 is 1:N. In the embodiment shown in FIG. 19, the first rotating shaft 195 is a gear mechanism component common to the gear mechanisms 191 and 192 in the first and second systems. The first rotating shaft 195, however, need not be common.

The gear mechanism 191 in the first system transmits revolution of the motor from the first rotating shaft 195 to second and third rotating shafts 196 and 197. A gear 195*b* of the first rotating shaft 195 meshes with a gear 196*a* of the second rotating shaft 196, and a gear 196*b* of the second rotating shaft 196 meshes with a gear 197*a* of the third rotating shaft 197. Rotation angles of the first to third rotating shafts are detected by angle detectors S1 to S3, respectively. The change ratio between gears meshed together of the gear mechanism 141 in the first system is set to $(m_1 \pm 1)/m_1$.

As shown in FIG. 19, in the gear mechanism 192 in the second system, gears 198*a*, 198*b*, and 199*a* are attached to fourth and fifth rotating shafts 198 and 199. Revolution of the motor 193 is transmitted from a gear 195*c* of the first rotating shaft 195 to the gear 199*a* via the gears 198*a* and 198*b*. Rotation angles of the first and second rotating shafts are detected by angle detectors S3 and S4, respectively. The change ratio between gears meshed together of the gear mechanism 192 in the second system is set to $(m_2 \pm 1)/m_2$.

Revolution of the motor 193 is reduced to 1/N via the gear 194*a* and gear 195*a* and is transmitted to the first rotating shaft 195. Revolution of the first rotating shaft 195 is transmitted from the gear 195*b* to the gear mechanism 191 in the first system and from the gear 195*c* to the gear mechanism 192 in the second system. Periodic signals which are obtained on the basis of angle detected values detected by the angle detectors S1 to S3 of the gear mechanism 191 in the first system and the angle detectors S1, S4, and S5 of the gear mechanism 192 in the second system are calculated by the same calculation method as the periodic signal calculation method described in the first embodiment. It is as described in Japanese Patent Laid-Open No. 2002-107178 and Japanese Patent No. 3967963 that if periods obtained in respective systems are relatively prime to each other, the number of revolutions corresponding to a period which is the least common multiple of the periods can be detected. Accordingly, for example, if the periodic signals of the first and second systems have periods of $C_1$ and $C_2$, respectively, multiple turns corresponding to the least common multiple of $C_1$ and $C_2$ can be detected by generating a signal with a period which is the least common multiple.

Assume that, in the transmission mechanism 190 in FIG. 19, $m_1$ is 15, $m_2$ is 16, and N is 10. In this case, the number of multi-turn revolutions which can be detected by the transmission mechanism 190 is as follows. Since the gear mechanism 191 in the first system and the gear mechanism 192 in the second system are each made up of three rotating shafts, the gear mechanism 191 and 192 can produce a periodic signal with a period of $m_1{}^2=225$ and a periodic signal with a period of $m_2{}^2=256$, respectively, as described in paragraph 0038. The periods are relatively prime to each other, and the least common multiple of the periods is 225 (period)×256 (period)=57,600 (period). Since the first rotating shaft 195 is reduced in speed to ⅒ of the motor rotating shaft 194, a detectable multi-turn detection range of the motor rotating shaft is 10 times, up to 576,000 revolutions.

As has been described above, in the fifth embodiment, the transmission mechanisms according to the first embodiment are provided in parallel, and detection ranges of the numbers of revolutions or periods of periodic signals which are obtained from the respective transmission mechanisms provided in parallel are set to be relatively prime to each other. With this configuration, a multi-turn detection range of a rotation angle detection device can be easily expanded. Although two parallel transmission mechanisms are provided in the fifth embodiment, if more parallel transmission mechanisms are provided, a rotation angle detection device with a wider multi-turn rotation angle detection range can be achieved.

Note that, in the above embodiments, an optical encoder is used as the angle detector of the first rotating shaft, and MR rotation angle sensors using MR elements are used as the angle detectors of the second to fourth rotating shafts. However, embodiment of the present invention does not limit the types of the angle detectors. Gears are used as the transmission mechanism. Means for changing rotation angles, however, is not limited to gears, and examples of the means include a transmission such as a belt, a chain, or a traction drive. Since (m±1)/m described above represents a change ratio, and the present embodiments have been described using gears as the transmission mechanism, m and m±1 correspond to the numbers of teeth of gears. The terms, however, are not limited to the numbers of teeth of gears.

The present embodiments have illustrated cases where a base unit quantity u for rotation angle detection is 1 (rev) or 1000 (pulse/rev). Any unit quantity, such as u=360(°), may be used as long as base unit quantities for respective rotating shafts are the same.

The present embodiments also have illustrated a case where a detector with a shaft angle multiplier of 1× (which outputs a signal for one cycle when a rotating shaft revolves once) is used. Even in a case where a detector with a shaft angle multiplier of n×(which outputs a signal for n cycles when a rotating shaft revolves once) is used, calculation of a multi-turn rotation angle is also possible. In this case, a multi-turn rotation angle detection range is 1/n. Note that even if detectors with different shaft angle multipliers are used, a multi-turn rotation angle can be calculated by performing calculation processing that equalizes all base unit quantities.

EXPLANATIONS OF REFERENCE NUMERALS rotating shaft: 11 to 15, 23 to 26, 143 to 145, 194 to 199
gear: 11a, 12a, 12b, 13a, 13b, 14a, 14b, 23a, 24a, 24b, 25a, 25b, 26a, 26b, 143a, 144a, 145a, 194a, 195a, 195b, 196a, 196b, 197a, 198a, 198b, 199a
motor: 21, 141, 193
optical absolute encoder: 22
signal processing circuit: 28, 152
magnet: 29a, 29b, 29c
MR rotation angle sensor: 30a, 30b, 30c
angle detector: S1 to Sn

What is claimed is:

1. A rotation angle detection device for detecting an absolute rotation angle of a first rotating shaft of first to nmax-th rotating shafts, comprising:
   a transmission mechanism adapted to transmit revolution from the first rotating shaft of the first to nmax-th rotating shafts down to an nmax-th rotating shaft of the first to nmax-th rotating shafts; and
   an angle detector adapted to detect respective rotation angles of the first rotating shaft to an n-th rotating shaft of the first to nmax-th rotating shafts;
   wherein:
   the first rotating shaft comprises a rotation angle $\theta_1$;
   the n-th rotating shaft comprises a rotation angle $\theta_n$; and
   the rotation angle $\theta_n$ satisfies a relationship with the rotation angle $\theta_1$ as follows:

$$\theta_n = \left(-\frac{m \pm 1}{m}\right)^{n-1} \times \theta_1,$$

where (a) nmax and m are integers not less than 3, and (b) n falls within a range 1≤n≤nmax; and
(m±1)/m is a change ratio between each adjacent two of the first to the nmax-th rotating shafts.

2. The rotation angle detection device according to claim 1, wherein:
   a rotation angle calculated value $\theta_c$ of the first rotating shaft is calculated as follows:

$$\theta_c = \mathrm{mod}((k_1 \times p_1 + k_2 \times p_2 + \ldots + k_n \times p_n), u) \times m^{n-1}$$

where (a) $p_1, P_2, \ldots, p_n$ are angle detected values of the first rotating shaft to the n-th rotating shaft which are detected by the angle detector, (b) u is an angle detected quantity for one cycle of the first to nmax-th rotating shafts, (c) mod(x,a) is a modulo operation which obtains a remainder left over when x is divided by a, and (d) coefficients $k_1, \ldots, k_n$ are a positive integer or a negative integer including a zero and the coefficients $k_1, \ldots, k_n$ correspond to a coefficient of an (n−1)-th degree term in x, respectively, when an expression $(x+1)^{n-1}$ is expanded.

3. The rotation angle detection device according to claim 1, wherein:
   the transmission mechanism transmits the revolution with the change ratio of (m±1)/m.

4. A rotation angle detection device for detecting a multi-turn absolute rotation angle of a first rotating shaft coupled to a motor, comprising:
   a gear mechanism comprising multiple gears, the multiple gears being fixed to rotating shafts from the first rotating shaft to an n-th rotating shaft; and an angle detector adapted to detect respective rotation angles of the first rotating shaft to the n-th rotating shaft;

wherein:
the multiple gears continuously mesh with each other; and the gear mechanism comprises multiple pairs of gears, each pair of the multiple pairs of gears being meshed together such that a ratio of change in rotational speed is (m±1)/m between two continuous rotating shafts.

5. A method for calculating a multi-turn absolute rotation angle of a first rotating shaft in a multi-turn absolute rotation angle detection device, the multi-turn absolute rotation angle detection device including (i) a transmission mechanism adapted to transmit revolution from the first rotating shaft of first to nmax-th rotating shafts down to the nmax-th rotating shaft and (ii) an angle detector adapted to detect angle detected values $p_1$ to $p_{nmax}$ within one revolution of the first rotating shaft to the nmax-th rotating shaft, wherein a rotation angle $\theta_n$ of an n-th rotating shaft satisfies a relationship with a rotation angle $\theta_1$ of the first rotating shaft as follows:

$$\theta_n = \left(-\frac{m \pm 1}{m}\right)^{n-1} \times \theta_1,$$

where (a) nmax and m are integers not less than 3, and (b) n falls within a range 1≤n≤nmax, the method comprising:

sequentially determining a coefficient $R_0$ to a coefficient $R_{nmax-2}$ by repeating, for n=2 to nmax, a rotation angle calculation comprising:

(1) detecting an angle detected value $p_n$ within one revolution of the n-th rotating shaft by the angle detector;

(2) estimating a coefficient $R_{n-2}$ as a function of a rotation angle calculated value $\theta_1(m^{n-2})'$; and (3) obtaining a rotation angle calculated value $\theta(m^{n-1})'$ by substituting the coefficient $R_{n-2}$ determined into a rotation angle calculation formula as follows:

$$\theta_{1(m^{n-1})'} = p_1 + \sum_{i=2}^{n}(R_{i-2} \times m^{i-2}) \times u;$$

and obtaining a multi-turn absolute rotation angle calculated value $\theta_1(m^{nmax-1})'$ by substituting the coefficient $R_0$ to the coefficient $R_{nmax-2}$ into the rotation angle calculation formula;

wherein:
the coefficients $R_0$ to $R_{nmax-2}$ are integers ranging from 0 to m-1 inclusive;
u is a base unit quantity; and
a rotation angle calculated value $\theta_1(m^0)'$ is the angle detected value $p_1$ of the first rotating shaft.

6. The method according to claim 5, wherein:
estimating the coefficient $R_{n-2}$ comprises:
obtaining a periodic signal $S(m^{n-1})$ using detected values of n shafts by a periodic signal formula as follows:

$$S_{(m^{n-1})} = \mathrm{mod}((k_1 \times p_1 + k_2 \times p_2' + k_3 \times p_3' + \ldots + k_{n-1} \times p_{n-1}' + k_n \times p_n) \times J^{n-1}, u),$$

where (a) $k_1, k_2, \ldots k_n$ are coefficients of a (n−1)-th degree term in x of an expansion $k_1 \times x^0 + k_2 \times x^1 + k_3 \times x^2 + \ldots + k_n \times x^{n-1}$ of $(x+1)^{n-1}$, (b) mod(x,a) is a modulo operation which obtains a remainder left over when x is divided by a, and (c) J is a sign-adjusting term which is 1 if a change ratio between each adjacent two of the first to nmax-th rotating shafts is −(m−1)/m and is −1 when the change ratio is −(m+1)/m;

multiplying the periodic signal $S(m^{n-1})$ of the n-th rotating shaft by $m^{n-1}$ to obtain a rotation angle calculated value $\theta_1(m^{n-1})$; and determining the coefficient $R_{n-2}$ such that a result of calculating the rotation angle calculation formula that obtains the rotation angle calculated value $\theta_1(m^{n-1})'$ of the n-th rotating shaft approximates the rotation angle calculated value $\theta^1(m^{n-1})$;

wherein:
the rotation angle calculated value $\theta_1(m^{n-1})'$ of the n-th rotating shaft is obtained by substituting the coefficient $R_{n-2}$ that is determined into the rotation angle calculation formula; and an angle corrected value $p_n'$ is obtained by substituting the rotation angle calculated value $\theta_1(m^{n-1})'$ obtained into an angle corrected value formula as follows:

$$p_n' = \mathrm{mod}\left(\left(-\frac{m \pm 1}{m}\right)^{n-1} \times \theta_{1(m^{n-1})'}, u\right).$$

7. The method according to claim 6, wherein:
estimating the coefficient $R_{n-2}$ comprises computing the coefficient $R_{n-2}$ according to an operation INT(x) as follows:

$$R_{n-2} = \mathrm{INT}\left(\mathrm{mod}\left(\frac{S_{(m^{n-1})} \times m}{u} - \frac{\theta_{1(m^{n-2})'}}{m^{n-2} \times u} + 0.5, m\right)\right),$$

where the operation INT(x) drops a fractional part of a numerical value of x.

8. The method according to claim 6, wherein:
the multi-turn absolute rotation angle detection device further includes (a) multiple other transmission mechanisms which are provided in parallel with the transmission mechanism and (b) multiple other angle detectors; and the method further comprises calculating multiple periodic signals based on multiple angle detected values detected by the angle detector and the multiple other angle detectors.

9. The method according to claim 8, wherein:
periods of the multiple periodic signals are relatively prime to each other.

10. The method according to claim 5, wherein:
estimating the coefficient $R_{n-2}$ comprises determining an integer which most closely approximates a result of calculating an integer formula as follows:

$$\frac{\theta_{1(m^{n-1})} - \theta_{1(m^{n-2})'}}{m^{n-2} \times u}.$$

11. The method according to claim 5, wherein:
the multi-turn absolute rotation angle detection device further includes (a) multiple other transmission mechanisms which are provided in parallel with the transmission mechanism and (b) multiple other angle detectors; and
the method further comprises calculating the multi-turn absolute rotation angle based on multiple angle detected values detected by the angle detector and the multiple other angle detectors.

12. A device for calculating a multi-turn absolute rotation angle, comprising:
a transmission mechanism adapted to transmit revolution from a first rotating shaft of first to nmax-th rotating shafts down to an nmax-th rotating shaft of the first to nmax-th rotating shafts;
an angle detector adapted to detect an angle detected value $p_1$ to an angle detected value $p_{nmax}$ within one revolution of the first rotating shaft to the nmax-th rotating shaft; and
a computing unit adapted to calculate a multi-turn absolute rotation angle calculated value $\theta_1(m^{nmax-1})'$ of the first rotating shaft based on the angle detected value $p_1$ to the angle detected value $p_{nmax}$;
wherein:
the first rotating shaft comprises a rotation angle $\theta_1$;
an n-th rotating shaft of the first to nmax-th rotating shafts comprises a rotation angle $\theta_n$; and
the rotation angle $\theta_n$ satisfies a relationship with the rotation angle $\theta_1$ as follows:

$$\theta_n = \left(-\frac{m \pm 1}{m}\right)^{n-1} \times \theta_1,$$

where (a) nmax and m are integers not less than 3, and (b) n falls within a range 1≤n≤nmax;
the computing unit sequentially determines values of a coefficient $R_0$ to a coefficient $R_{nmax-2}$ by repeatedly, for n=2 to nmax, determining a coefficient $R_{n-2}$ from a rotation angle calculated value $\theta_1(m^{n-2})'$ and from an angle detected value $p_n$ of the n-th rotating shaft and calculating based on the coefficient $R_{n-2}$ that is determined a rotation angle calculated value $\theta_1(m^{n-1})'$ by a rotation angle calculation formula as follows:

$$\theta_{1(m^{n-1})'} = p_1 + \sum_{i=2}^{n}(R_{i-2} \times m^{i-2}) \times u,$$

and obtains the multi-turn absolute rotation angle calculated value $\theta_1(m^{nmax-1})'$ of the first rotating shaft;
the coefficients $R_0$ to $R_{nmax-2}$ are integers ranging from 0 to m−1 inclusive;
u is a base unit quantity; and
a rotation angle calculated value)$\theta_1(m^0)'$ is the angle detected value $p_1$ of the first rotating shaft.

13. The device according to claim 12, wherein the computing unit contains circuitry configured to:
obtain a periodic signal $S(m^{n-1})$ obtained from detected values of n shafts by a period signal formula as follows:

$S_{(m^{n-1})}=\text{mod}((k_1 \times p_1 + k_2 \times p_2' + k_3 \times p_3' + \ldots + k_{n-1} \times p_{n-1}' + k_n \times p_n) \times j^{n-1}, u)$ where (a) $k_1, k_2, \ldots k_n$ are coefficients of a (n−1)-th degree term in x of an expansion $k_1 \times x^0 + k_2 \times x^1 + k_3 \times x^2 + \ldots + k_n \times x^{n-1}$ of $(x+1)^{n-1}$, (b) mod(x,a) is a modulo operation which obtains a remainder left over when x is divided by a, and (c) J is a sign-adjusting term which is 1 if a change ratio between each adjacent two of the first to nmax-th rotating shafts is −(m−1)/m and is −1 when the change ratio is −(m+1)/m;
obtain a rotation angle calculated value $\theta_1(m^{n-1})$ by multiplying the periodic signal $S(m^{n-1})$ of the n-th rotating shaft by $m^{n-1}$;
determine a coefficient $R_{n-2}$ such that a result of calculating the rotation angle calculation formula that obtains the rotation angle calculated value $\theta_1(m_{n-1})'$ of the n-th rotating shaft approximates the rotation angle calculated value $\theta_1(m^{n-1})$;
substitute the coefficient $R_{n-2}$ determined into the rotation angle calculation formula to obtain the rotation angle calculated value $\theta_1(m^{n-1})'$ of the n-th rotating shaft; and
obtain an angle corrected value $p'''$ by substituting the rotation angle calculated value $\theta_1(m^{n-1})'$ obtained into an angle corrected value formula as follows:

$$p'_n = \text{mod}\left(\left(-\frac{m \pm 1}{m}\right)^{n-1} \times \theta_{1(m^{n-1})'}, u\right).$$

14. The device according to claim 13, wherein:
the coefficient $R_{n-2}$ is determined according to an operation INT(x) as follows:

$$R_{n-2} = \text{INT}\left(\text{mod}\left(\frac{S_{(m^{n-1})} \times m}{u} - \frac{\theta_{1(m^{n-2})'}}{m^{n-2} \times u} + 0.5, m\right)\right),$$

where the operation INT(x) drops a fractional part of a numerical value x.

15. The device according to claim 13, further comprising:
multiple other transmission mechanisms which are provided in parallel with the transmission mechanism; and
multiple other angle detectors;
wherein:
multiple periodic signals are calculated based on multiple angle detected values detected by the angle detector and the multiple other angle detectors.

16. The device according to claim 15, wherein:
periods of the multiple periodic signals are relatively prime to each other.

17. The device according to claim 12, wherein:
the coefficient $R_{n-2}$ is obtained by determining an integer which most closely approximates a result of calculating an integer formula as follows:

$$\frac{\theta_{1(m^{n-1})} - \theta_{1(m^{n-2})'}}{m^{n-2} \times u}.$$

18. The device according to claim 12, further comprising:
multiple other transmission mechanisms which are provided in parallel with the transmission mechanism; and
multiple other angle detectors;
wherein:
the multi-turn absolute rotation angle is calculated based on multiple angle detected values detected by the angle detector and the multiple other angle detectors.

19. The device according to claim 18, wherein:
the first rotating shaft of the transmission mechanism and first rotating shafts of the multiple other transmission mechanisms are a same rotating shaft.

20. A method for calculating a multi-turn absolute rotation angle calculated value $\theta_1(m^{nmax-1})'$ of a first rotating shaft in a multi-turn absolute rotation angle detection device, the multi-turn absolute rotation angle detection device including (i) a transmission mechanism adapted to transmit revolution from the first rotating shaft of first to nmax-th rotating shafts down to the nmax-th rotating shaft of the first to nmax-th rotating shafts and (ii) an angle detector adapted to detect an angle detected value $p_1$ to an angle detected value $p_{nmax}$ within one revolution of the first rotating shaft to the nmax-th rotating shaft, wherein a rotation angle $\theta_n$ of an n-th rotating shaft of the first to nmax-th rotating shafts satisfies a relationship with a rotation angle $\theta_1$ of the first rotating shaft as follows:

$$\theta_n = \left(-\frac{m \pm 1}{m}\right)^{n-1} \times \theta_1,$$

where (a) nmax and m are integers not less than 3, and (b) n falls within a range 1≤n≤nmax, the method comprising:
  detecting the angle detected value $p_1$ to the angle detected value $p_{nmax}$ within one revolution of the first rotating shaft to the nmax-th rotating shaft by the angle detector; and
  determining a coefficient $R_0$ to a coefficient $R_{nmax-2}$, where determining the coefficient $R_0$ to the coefficient $R_{nmax-2}$ comprises sequentially determining the coefficient $R_0$ to the coefficient $R_{nmax-2}$ by repeating, for n=2 to nmax:
    (1) determining a coefficient $R_{n-2}$ from a rotation angle corrected value $p_n'$ of the n-th rotating shaft, the coefficient $R_{n-2}$ being determined such that the angle corrected value $p_n'$ obtained by an angle corrected value calculation formula as follows:

$$p_n' = \text{mod}\left(\left(-\frac{m \pm 1}{m}\right)^{n-1} \times \left(p_1 + \sum_{i=2}^{n}(R_{i-2} \times m^{i-2}) \times u\right), u\right)$$

most closely approximates an angle detected value $p_n$ of the n-th rotating shaft; and
    (2) substituting the coefficients $R_0$ to $R_{nmax-2}$ determined into a rotation angle calculation formula as follows:

$$\theta_{1(m^{n\ max-1})'} = p_1 + \sum_{i=2}^{nmax}(R_{i-2} \times m^{i-2}) \times u,$$

to obtain the multi-turn absolute rotation angle calculated value $\theta_1(m^{nmax-1})$ of the first rotating shaft;
wherein:
  the coefficients $R_0$ to $R_{nmax-2}$ are integers ranging from 0 to m−1 inclusive;
  u is a base unit quantity; and
  an angle corrected value $p_1'$ is the angle detected value $p_1$ of the first rotating shaft.

21. The method according to claim 20, wherein:
determining the coefficient $R_{n-2}$ comprises determining an integer which most closely approximates a result of calculating an operation as follows:

$$\text{mod}\left(\mp\left(p_n - \left(-\frac{m \pm 1}{m}\right)^{n-1} \times \theta_{1(m^{n-2})'}\right) \times \frac{m}{u}, m\right).$$

22. The method according to claim 20, wherein:
the multi-turn absolute rotation angle detection device further includes (a) multiple other transmission mechanisms which are provided in parallel with the transmission mechanism and (b) multiple other angle detectors; and
the method further comprises calculating a multi-turn absolute rotation angle based on multiple angle detected values detected by the angle detector and the multiple other angle detectors.

23. The method according to claim 22, wherein:
the first rotating shaft of the transmission mechanism and first rotating shafts of the multiple other transmission mechanisms are a same rotating shaft.

* * * * *